United States Patent
Galford

(10) Patent No.: US 11,175,432 B2
(45) Date of Patent: Nov. 16, 2021

(54) MONTE CARLO MODELING OF THORIUM BLANKET FIELD CALIBRATORS

(71) Applicant: HALLIBURTON ENERGY SERVICES, INC., Houston, TX (US)

(72) Inventor: James E. Galford, Missouri City, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 834 days.

(21) Appl. No.: 15/774,989

(22) PCT Filed: Sep. 5, 2017

(86) PCT No.: PCT/US2017/050125
§ 371 (c)(1),
(2) Date: May 9, 2018

(87) PCT Pub. No.: WO2019/050505
PCT Pub. Date: Mar. 14, 2019

(65) Prior Publication Data
US 2021/0173115 A1    Jun. 10, 2021

(51) Int. Cl.
*G01V 5/06* (2006.01)
*G01T 1/167* (2006.01)
*G01T 7/00* (2006.01)

(52) U.S. Cl.
CPC .............. *G01V 5/06* (2013.01); *G01T 1/167* (2013.01); *G01T 7/005* (2013.01)

(58) Field of Classification Search
CPC .......... G01T 7/005; G01T 1/167; G01V 5/12; G01V 5/06; G01V 1/44; G01V 5/101; G01V 5/04; G01V 13/00; G01V 1/50
See application file for complete search history.

(56) References Cited

U.S. PATENT DOCUMENTS

| | | |
|---|---|---|
| 4,492,863 A | 1/1985 | Smith, Jr. |
| 4,527,058 A | 7/1985 | Smith, Jr. |

(Continued)

FOREIGN PATENT DOCUMENTS

WO    WO-2017069865 A1    4/2017

OTHER PUBLICATIONS

Korean Intellectual Property Office, PCT/US2017/050125, International Search Report and Written Opinion, dated Feb. 27, 2018, 16 pages, Korea.

(Continued)

*Primary Examiner* — David P Porta
*Assistant Examiner* — Fani Boosalis

(57) ABSTRACT

System and methods for calibrating gamma ray tools using blanket field calibrator models is provided. A counting rate of a first gamma ray tool is simulated based on a model of a first blanket calibrator. When it is determined that the simulated counting rate matches a measured counting rate associated with the first gamma ray tool, a tally multiplier and a corresponding material specification for the model of the first blanket calibrator is determined. A counting rate for a second gamma ray tool is simulated based on the tally multiplier and the material specification determined for the model of the first blanket calibrator. A sensitivity factor for the second gamma ray tool is determined based on the simulation. The second gamma ray tool is calibrated according to a nominal blanket activity calculated from the sensitivity factor of the second gamma ray tool.

20 Claims, 12 Drawing Sheets

(56) References Cited

U.S. PATENT DOCUMENTS

| | | |
|---|---|---|
| 7,482,578 B2 * | 1/2009 | Randall .................. G01T 7/005 |
| | | 250/261 |
| 2007/0284518 A1 | 12/2007 | Randall |
| 2012/0075953 A1 | 3/2012 | Chace et al. |
| 2014/0100785 A1 | 4/2014 | Sloan |
| 2015/0177198 A1 | 6/2015 | Thierry et al. |
| 2017/0089846 A1 | 3/2017 | Guo et al. |

OTHER PUBLICATIONS

Andrey N. Berlizov, MCNP-CP: A Correlated Particle Radiation Source Extension of a General Purpose Monte Carlo N-Particle Transport Code, Nov. 16, 2006, 12 pages, American Chemical Society, Chapter 13, Institute for Nuclear Research, National Academy of Sciences of Ukraine, Ukraine.

Judith F. Briesmeister, MCNP TM—A General Monte Carlo N-Particle Transport Code, Dec. 18, 2000, 790 pages, LA-1709-M Manual, Oak Ridge, Tennessee.

Jagdish K. Tuli, Evaluated Nuclear Structure Data File, A Manual for Preparation of Data Sets, Feb. 2001, 112 pages, BNL-NCS-51655-01/02-Rev, National Nuclear Data Center, Upton, New York.

S.Y.F. Chu, L.P. Ekstrom and R.B. Firestone, The Lund/LBNL Nuclear Data Search, Feb. 1999, 1 page, Version 2.0, http://nucleardata.nuclear.lu.se/toi/ (last visited on May 9, 2018).

* cited by examiner

MONTE CARLO MODELING OF THORIUM BLANKET FIELD CALIBRATORS

CROSS-REFERENCE TO RELATED APPLICATIONS

This application is a U.S. national stage patent application of International Patent Application No. PCT/US2017/050125, filed on Sep. 5, 2017, the benefit of which is claimed and the disclosure of which is incorporated herein by reference in its entirety.

FIELD OF THE DISCLOSURE

The present disclosure relates generally to gamma ray logging tools and, more particularly, to the calibration of gamma ray logging tool hardware configurations for hydrocarbon exploration and production operations.

BACKGROUND

A master calibration process is required to commercially deploy new natural gamma ray tool hardware configurations. Two parameters are derived during the master calibration process: (1) a counting rate to an American Petroleum Institute (API) unit conversion factor; and (2) an equivalent nominal API activity of a "blanket" field calibrator for calibrating the gamma ray logging tool in the field. Such blanket field calibrators may be manufactured using different sized sheets of radioactive material. The radioactive material may comprise a mixture of naturally radioactive monazite sand containing thorium and/or uranium and urethane fabricated into flexible sheets. The amount. or radioactive sand contained in each blanket is not tightly controlled, and the total activity varies from blanket to blanket. Newly manufactured blankets are calibrated by following a procedure that relates their activity to a reference (or "golden") blanket. Each blanket is assigned an API unit value, which is used to calibrate gamma ray logging tools in the field.

However, a blanket may be used with tool configurations whose outside diameters depart from that of a standard or default tool configuration for which the blanket was designed to fit. For example, a blanket that is used on a tool having a larger diameter than that of the standard tool would leave a gap between the long edges of the blanket. Likewise, a blanket that is used on a tool having a smaller diameter than that of the standard tool would cause the long edges of the blank to overlap. Such geometrical variations in combination with the various alloys used to manufacture different gamma ray tools may cause each new tool design or configuration to produce a unique response to the reference or "golden" blanket. This unique "golden" blanket response defines the equivalent nominal blanket activity for a given tool design.

Currently, the equivalent nominal blanket activity is derived from measurements obtained using a gamma ray pit at the API Calibration Facility located on the University of Houston campus. The gamma ray pit at the API Calibration Facility defines the API unit for natural gamma ray logs used throughout the petroleum industry. However, the gamma ray pit is rapidly deteriorating and may soon become unusable or inaccessible. As the construction of a replacement industry standard calibration facility may not be feasible for a number of reasons, including current economic conditions in the petroleum exploration industry, an alternative to a physical API calibration facility will be needed to derive the equivalent nominal thorium blanket activity for calibrating new tool designs or configurations.

DESCRIPTION OF ILLUSTRATIVE EMBODMENTS

Figure 1:
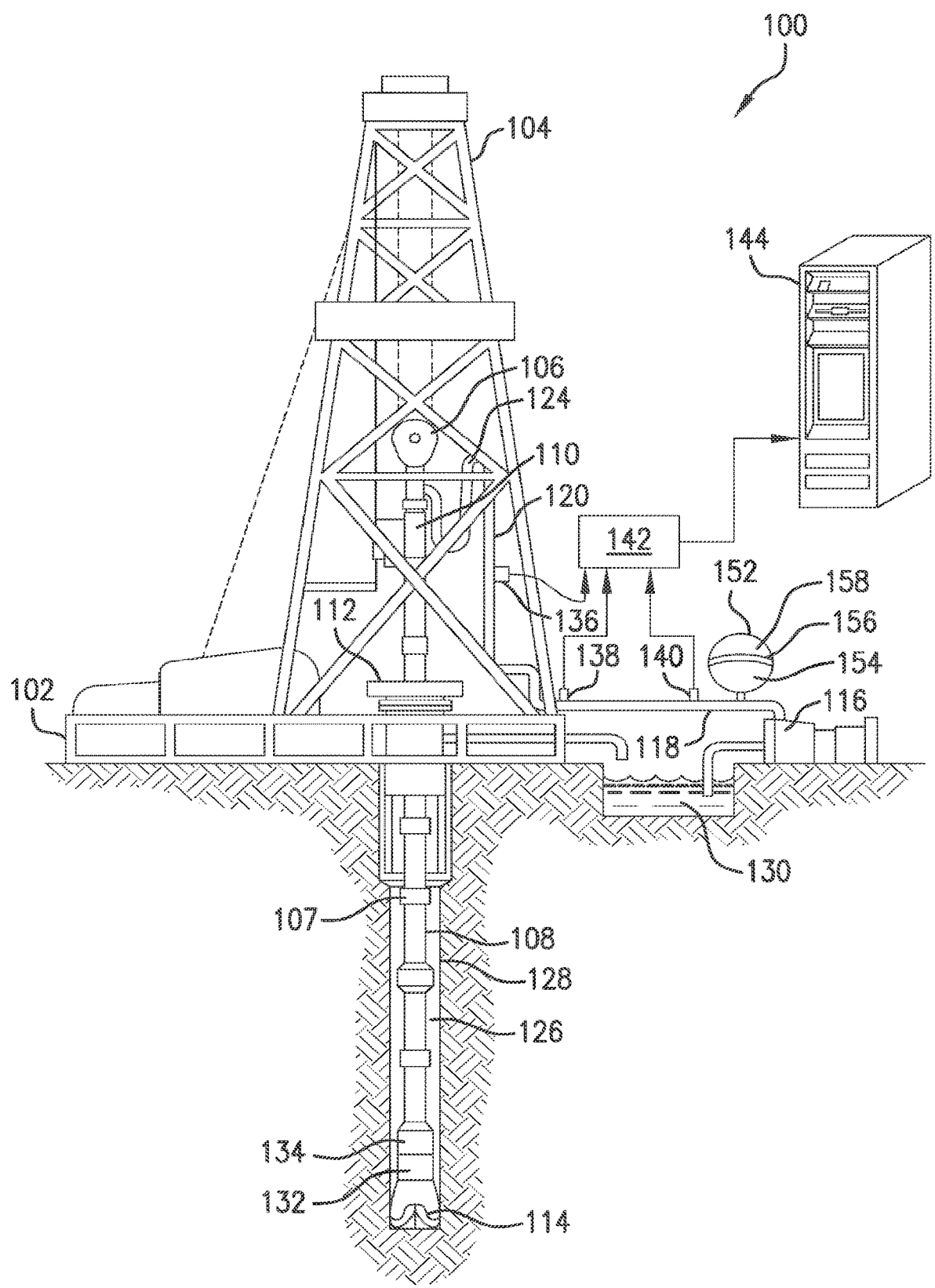
FIG. 1 is a diagram of an illustrative drilling system including a gamma ray tool for performing logging-while-drilling (LWD) operations at a well site.

Embodiments of the present disclosure relate to calibrating gamma ray tools using Monte Carlo models of thorium blanket field calibrators. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

The terms "blanket" and "blanket calibrator" (or "blanket field calibrator") are used interchangeably herein to refer broadly and inclusively to any of various blanket field calibrators used to calibrate new gamma ray logging tool designs and/or configurations in the field. Such blanket field calibrators may be manufactured using different sized sheets of radioactive material. The radioactive material may comprise a mixture of naturally radioactive monazite sand, containing thorium and/or uranium, and urethane fabricated into flexible sheets. The amount or radioactive material and thus, total activity may vary from one blanket to another. Each blanket is assigned an American Petroleum Institute (API) unit value, which is used to calibrate gamma ray logging tools in the field.

The terms "counting rate", "response", and "counting rate response" are used interchangeably herein to refer to a gamma ray tool's actual or simulated measurements of gamma rays emitted from a gamma ray source. The gamma ray source may be, for example, a radioactive formation or the radioactive material of a blanket calibrator as described above. The gamma ray tool may include a gamma ray detector and associated electronics for detecting and storing gamma ray counts or count rates. As will be described in further detail below, the gamma ray counts detected and/or stored by a downhole gamma ray tool may be transmitted to a computing device at the surface for performing the field calibration techniques disclosed herein.

While embodiments of the present disclosure may be described in the context of thorium blanket calibrators, it should be appreciated that the disclosed. calibration techniques are not intended to be limited thereto and that these techniques may be applied to other types of radioactive field calibrators for calibrating any of various natural gamma ray tool designs and configurations. Such field calibrators may be fabricated using other sources of radioactivity (e.g., uranium, radium, or potassium) in any of various shapes and/or sizes. Also, while some of these examples may be described in the context of field calibrators for wireline natural gamma ray tools, it should be appreciated that embodiments are not intended to be limited thereto and the disclosed embodiments may be applied to similar instruments designed for slickline, coiled tubing, and logging while drilling applications.

As will be described in further detail below, embodiments of the present disclosure may be used to calibrate a new gamma ray logging tool design or configuration based on simulated responses of the particular tool to a radioactive field calibrator (e.g., a thorium blanket), In one or more embodiments, a Monte Carlo model of a reference thorium blanket may be used to simulate the counting rate responses of a reference gamma ray tool design or configuration. Such a reference tool design or configuration may be any known design or configuration associated with a previously calibrated gamma. ray tool. The Monte Carlo model described herein may represent the geometry and material descriptions of both the blanket and the tool, e.g., where the modeled blanket is configured to be wrapped around the tool. The Monte Carlo model may also represent the gamma ray source including the relevant gamma ray source descriptions, e.g., simulated isotopes, probability distributions, etc. of the radioactive material in the blanket or other source material. In some implementations, the Monte Carlo model may be based on an extended version of the Monte Carlo N-Particle (MCNP) code developed by the Los Alamos National Laboratory, e.g., version 4C of the MCNP (or "MCNP-CP"). However, it should be appreciated that embodiments are not limited thereto and that the disclosed calibration techniques may be performed using any of various other Monte Carlo photon transport computer codes for simulating correlated particle transport arising from complex, cascade decay transitions.

In one or more embodiments, the MCNP (or MCNP-CP) code may be used to apply a calculated tally multiplier to the simulated tool responses based on the Monte Carlo model of the reference thorium blanket. The tallied simulation results may then be converted into absolute counting rates, which can be compared directly with measured counting rates obtained with the actual reference tool hardware. Alternatively, the tally results may be converted to counting rates after the simulation is completed. If the simulated counting rates are determined not to match the measured counting, rates for the reference tool design within a specified error tolerance, the simulation may be repeated until a satisfactory match is achieved. Each simulation may be performed using a new tally multiplier and material specification (e.g., monazite sand-urethane mixture material description) for the reference thorium blanket by iteratively adjusting or varying the thorium content of the blanket. Once a match is found, the tally multiplier and material specification of the reference blanket model from the previous simulation may be used to simulate the counting rate responses of a new tool design or configuration. The simulated response of the new tool design or configuration may be used to determine the new tool's counting rate to API unit conversion factor (also referred to herein as "sensitivity factor" or "tool sensitivity"). The tool's sensitivity factor may then be used to calculate a nominal thorium blanket activity for calibrating the new tool design or configuration.

Illustrative embodiments and related methodologies of the present disclosure are described below in reference to FIGS. 1-12 as they might be employed, for example, in a computer system for calibrating gamma ray tools in the field using Monte Carlo models of blanket field calibrators. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an illustrative drilling system 100 for performing logging-while-drilling (LWD) operations at a well site. As shown in FIG. 1, system 100 includes a drilling platform 102 located at the surface of a borehole or wellbore 126. Wellbore 126 is drilled into different layers of a subsurface rock formation using a drill string 108 that includes a string of drill pipes connected together by "tool" joints 107. Drilling platform 102 is equipped with a derrick 104 that supports a hoist 106. Hoist 106 suspends a top drive 110 that is used to lower drill string 108 through a wellhead 112 and rotate drill string 108 within wellbore 126. Connected to the lower portion or distal end of drill string 108 is a bottom hole assembly (BHA), which includes a drill bit 114, at least one downhole tool 132, and a telemetry device 134. It should be appreciated that drill bit 114, downhole tool 132, and telemetry device 134 may be implemented as separate components within a housing of the BHA at the end of drill string 108. Although not shown in FIG. 1, it should also be appreciated that the BHA may include additional components for supporting various functions related to the drilling operations being conducted. Examples of such components include, but are not limited to, drill collars, stabilizers, reamers, and hole-openers.

Drilling of wellbore 126 occurs as drill bit 114 penetrates the subsurface formation while rotating at the end of drill string 108. Drill bit 114 may be rotated in conjunction with the rotation of drill string 108 by top drive 110. Additionally or alternatively, drill bit 114 may be rotated independently from the rest of drill string 108 by a downhole motor (not shown) positioned near drill bit 114. Although wellbore 126 is shown in FIG. 1 as a vertical wellbore, it should be appreciated that wellbore 126 may be drilled in a non-vertical, horizontal, or near-horizontal direction, e.g., as a deviated well drilled at angles approaching or at 90 degrees from vertical.

Drilling fluid may be pumped at high pressures and volumes by a mud pump 116 through a flow line 118, a stand pipe 120, a goose neck 124, top drive 110, and drill string 108 to emerge through nozzles or jets in drill bit 114. The drilling fluid emerging from drill bit 114 travels back up wellbore 126 via a channel or annulus formed between the exterior of drill string 108 and a wellbore wall 128. The drilling fluid then goes through a blowout preventer (not specifically shown) and into a mud pit 130 at the surface, where the fluid is cleaned and recirculated by mud pump 116 through drill string 108 and wellbore 126. The drilling fluid may be used for various purposes during the drilling operation including, but not limited to, cooling drill bit 114, carrying cuttings from the base of the bore to the surface, and balancing the hydrostatic pressure in the rock formations.

Downhole tool 132 may be used to collect information related to downhole drilling conditions and surrounding formation properties as wellbore 126 is drilled over different stages of the drilling operation. In one or more embodiment, downhole tool 132 may be a gamma ray logging tool for collecting gamma ray measurements (i.e., counting rate responses) relating to such downhole conditions and formation properties. In some implementations, downhole tool 132 may include gamma ray detectors or sensors in addition to other sensors for collecting information relating to the position and orientation of drill string 108 and/or drill bit 114 within the subsurface formation. Alternatively, the gamma ray sensors and/or position sensors may be distributed along drill string 108. While only downhole tool 132 is shown in FIG. 1, it should be appreciated that the disclosed embodiments are not intended to be limited thereto and that additional downhole tools may be used.

In one or more embodiments, the measurements may be collected or logged by downhole tool 132 at one or more logging points corresponding to each stage of the drilling operation along a portion of the planned well path. For example, the measurements collected at each logging point may be accumulated over the course of the drilling operation. The accumulated logs may be stored, for example, in a local memory or storage device coupled to downhole tool 132. Additionally or alternatively, the downhole measurements may be transferred from downhole tool 132 via a wired connection or other communication pathway to the surface, as will be described in further detail below.

In one or more embodiments, the information collected by downhole tool 132 may be transmitted to the surface via telemetry device 134. Telemetry device 134 may be part of a communication subsystem of drill string 108. Telemetry device 134 may be communicatively coupled to downhole tool 132 for receiving data related to the formation properties and downhole conditions measured and/or recorded by downhole tool 132. Telemetry device 134 may transmit the downhole information received from downhole tool 132 to computer 144 located at the surface of the well site. The information may be transmitted using any suitable communication channel (e.g., pressure pulses within the drilling fluid flowing in drill string 108, acoustic telemetry through the pipes of the drill string 108, electromagnetic telemetry, optical fibers embedded in the drill string 108, or any combination thereof). For example, drilling system 100 may employ mud pulse telemetry for transmitting downhole information collected by downhole tool 132 to the surface during the drilling operation. However, it should be appreciated that embodiments are not limited thereto and that any of various other types of data communication techniques may be used for sending the downhole information to the surface. Such techniques may include, for example and without limitation, wireless communication techniques and wireline or any other type of wired electrical communication techniques.

To reduce noise in the downhole data received at the surface, drilling system 100 may include a dampener or desurger 152 to reduce noise. Flow line 118 couples to a drilling fluid chamber 154 in desurger 152. A diaphragm or separation membrane 156 separates the drilling fluid chamber 154 from a gas chamber 158. Desurger 152 may include a gas chamber 158 filled with nitrogen at a predetermined percentage, e.g., approximately 50% to 75% of the operating pressure of the drilling fluid. The diaphragm 156 moves with variations in the drilling fluid pressure, enabling the gas chamber to expand and contract, thereby absorbing some of the pressure fluctuations.

In the above mud pulse telemetry example, telemetry device 134 may encode the downhole information using a data compression scheme and transmit the encoded data to the surface by modulating the flow of drilling fluid through drill sting 108 so as to generate pressure pulses that propagate to the surface. The pressure pulses may be received at the surface by various transducers 136, 138 and 140, which convert the received pulses into electrical signals for a signal digitizer 142 (e.g., an analog to digital converter). While three transducers 136, 138 and 140 are shown in FIG. 1, greater or fewer numbers of transducers may be used as desired for a particular implementation. Digitizer 142 supplies a digital form of the pressure signals to a computer 144.

Computer 144 may be any type of computing device or system having at least one processor and a memory for processing and storing the downhole information, e.g., gamma ray measurements, collected by downhole tool 132 during the drilling operation. Computer 144 may be physically located at the surface of the well site, e.g., near drilling rig 104, or at a remote location from the well site. For example, while not shown in FIG. 1, computer 144 may be communicatively coupled to one or more other computer systems via a communication network, e.g., a local area, medium area., or wide area network, such as the Internet. Such other computer systems may include remote computer systems located away from the well site for remotely monitoring and controlling well site operations via the communication network.

In one or more embodiments, computer 144 may function as a surface control system of drilling rig 104 for monitoring and controlling downhole operations at the well site. Computer 144 may be implemented using any type of computing device having at least one processor and a memory. Computer 144 may process and decode the digital signals received from digitizer 142 using an appropriate decoding scheme. The resulting decoded telemetry data. may be further analyzed and processed by computer 144 to display useful information to a well site operator. For example, computer 144 may process gamma ray measurements collected by downhole tool 132 for purposes of correlating logging data with depth, evaluating the shale content of a formation, and analyzing changes in formation mineralogy. The results of the processing performed by computer 144 may also be used to make appropriate adjustments to one or more drilling parameters, e.g., for purposes of adjusting or optimizing a path of wellbore 126 being drilled through the formation.

In one or more embodiments, computer 144 may provide an interface enabling the well site operator at the surface to receive indications of downhole operating conditions and adjust one or more of controllable parameters of the drilling operation accordingly. The interface may be include a display for presenting relevant information, e.g., values of drilling parameters or operational variables, to the operator during the drilling operation as well as a user input device (e.g., a mouse, keyboard, touch-screen, etc.) for receiving input from the operator. As downhole operating conditions may continually change over the course of the operation, the operator may use the interface provided by computer 144 to react to such changes in real time by adjusting selected drilling parameters in order to increase and/or maintain drilling efficiency and thereby, optimize the drilling operation.

Thus, in addition to transmitting information collected downhole to the surface, telemetry device 134 may receive information from the surface over one or more of the above-described communication channels. The information received from the surface may include, for example, signals for controlling the operation of the BHA or individual components thereof. Such control signals may be used, for example, to update operating parameters of the BHA for purposes of adjusting a planned trajectory or path of wellbore 126 through the formation during different stages of the drilling operation. In one or more embodiments, the control signals may be representative of commands input by a well site operator for making adjustments to the path of wellbore 126 or controlling various operational variables of the drilling operation as downhole conditions change over time. Examples of such operational variables may include, but are not limited to, weight on bit, drilling fluid flow through the drill pipe, the drill string rotational speed, and the density and viscosity of the drilling fluid.

Figure 2:
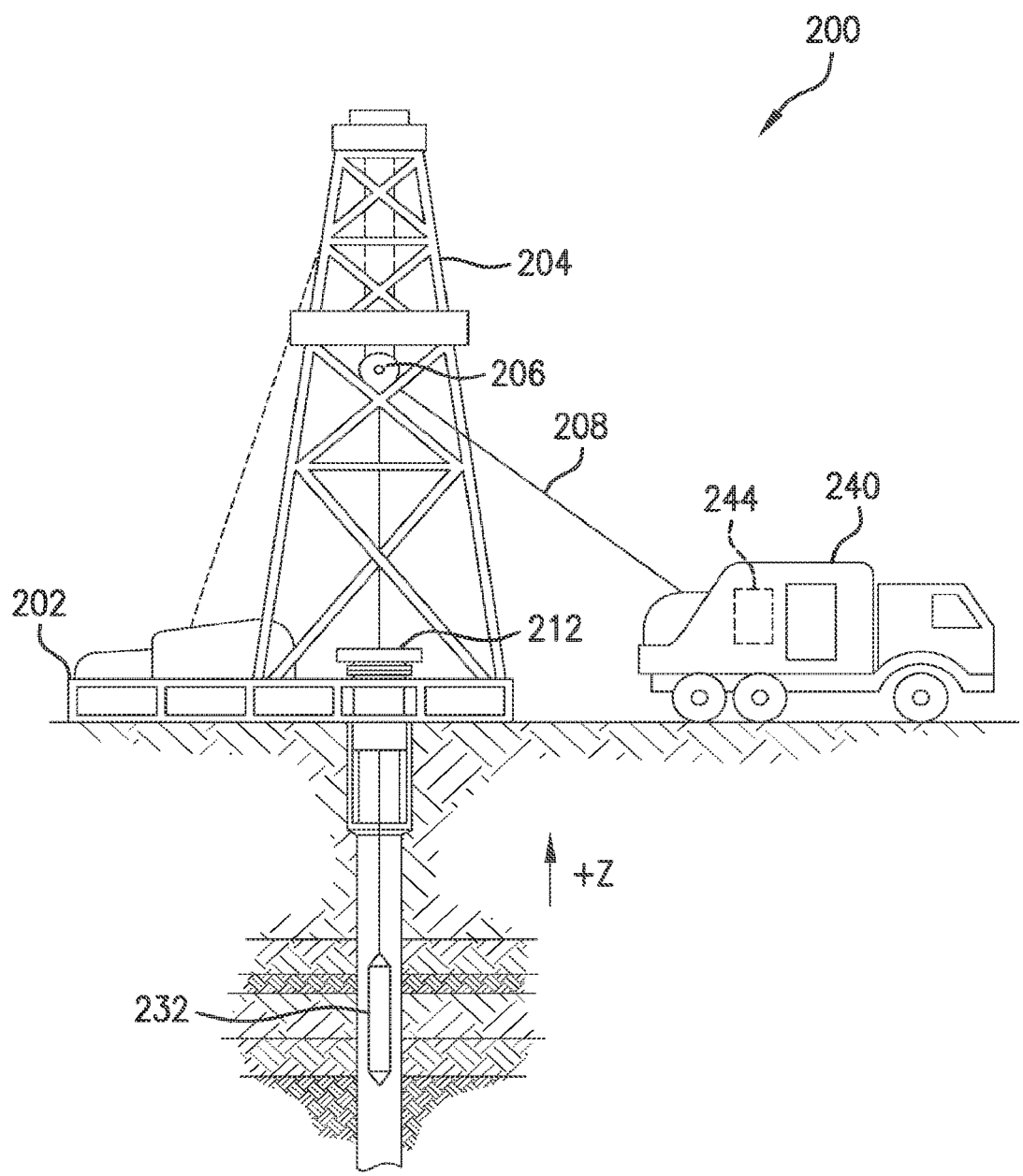
FIG. 2 is a diagram of an illustrative drilling system including a gamma ray tool for performing wireline logging operations at a well site.

FIG. 2 is a diagram of an illustrative drilling system 200 for performing wireline logging operations at a well site. As shown in FIG. 2, a drilling platform 202 is equipped with a derrick 204 that supports a hoist 206. Hoist 206 is used to lower a downhole tool 232 through a wellhead 212 within the wellbore. Downhole tool 232 may be a wireline gamma ray logging tool for conducting logging operations downhole at various times during the drilling process. For example, a drill string (e.g., drill string 108, as shown in FIG. 1 and described above) may be removed from the wellbore periodically or after drilling has been completed, and downhole tool 232 may be inserted for purposes of measuring formation properties in the area surrounding the wellbore at various depths within the formation. Downhole tool 232 in this example may be a gamma ray logging sonde suspended by a cable 208 wrapped around hoist 206. Cable 208 may have conductors for transporting power to the sonde and gamma ray measurements from gamma ray logging sensors (and any other sensors) of the sonde to the surface. Downhole tool 232 may have pads and/or centralizing springs to maintain the tool near the axis of the borehole as the tool is pulled uphole. A logging facility 240 includes a computer 244 for processing and storing the gamma ray measurements received from downhole tool 232.

Like computer 144 of FIG. 1 described above, computer 244 may be used for processing and storing downhole information collected by downhole tool 232. Also, like computer 144 of FIG. 1, computer 244 may be used for monitoring and controlling downhole operations at the well site. Computer 244 may be implemented using any type of computing device having at least one processor and a memory. As described above, downhole tools 132 and 232 may be gamma ray tools for collecting gamma ray measurements from the surrounding formation over the course of the drilling operation. In one or more embodiments, computers 144 and 244 may be used to calibrate such gamma ray tools 132 and 232, respectively, based on Monte Carlo models of thorium blanket field calibrators, as will be described in further detail below. It should be appreciated that in addition to LWD and wireline applications, the embodiments disclosed herein may be applied to slickline, coil tubing, measurement-while-drilling ("MWD") and any other type of downhole tubular assembly as desired for a particular implementation.

In one or more embodiments, the calibration of gamma ray tools may be performed using a secondary thorium blanket calibrator. One advantage of such a calibration device is that it can be used with a variety of tool designs and configurations. In this context, a tool design may consist of deploying a scintillation detector and associated electronics for downhole operation. The same tool design may be configured in a variety of ways, for example, by selecting different alloys or pressure housing geometry as necessary to protect the detector and electronics from the borehole environment. Each tool design or configuration may respond differently to the radioactivity contained in a thorium blanket calibrator. There are several ways to deploy thorium blanket calibrators in the field and support their use with multiple tool designs and tool configurations. For example, apparent activity values may be assigned to each blanket for each tool design or configuration when they are manufactured. However, this approach quickly becomes unworkable when more blankets are added to the fleet or when new tool designs or configurations are created.

An alternative and more practical approach may be to assign all wireline thorium blanket calibrators a single activity value when they are manufactured. This assigned activity value may then be used whenever the blanket is used in the field to calibrate any tool design or configuration that is compatible with the blanket's size. Nominal equivalent blanket activity values for each of the available tool designs/configurations may be stored for use during field calibrations at a well site. Such nominal equivalent blanket activity values may provide a way to calculate an equivalent blanket activity, in API units, for a given tool design or configuration.

In one or more embodiments, one or more thorium blanket calibrators may be designated as reference (or "golden") blankets, The thorium blanket activity, expressed in API units, of such a reference blanket may be assigned a value based on responses obtained with a calibrated logging tool. Activity values are generally assigned to newly manufactured blanket calibrators by first calibrating a tool of the same type as that originally used to obtain the activity values assigned to the reference blanket. The readings obtained with the new blankets and the calibrated tool may then be used to assign API unit values to the new blankets.

In one or more embodiments, the equivalent nominal blanket activity, PRESGR, for a given tool design or configuration may be derived during the above-described calibration is process using Equation (1):

$$PRESGR = \frac{(\text{Blanket\_CR} - \text{Bkgrd\_Cr}) \times \text{Tool\_sensitivity} \times 200 \; API}{\text{Assigned\_blanket\_activity}} \quad (1)$$

where Blanket_CR is the counting rate in counts per second (cps) obtained from the gamma ray tool with the reference thorium blanket calibrator wrapped around it, Bkgrd_CR is the ambient background counting rate in cps, and Tool_sensitivity is the counting rate-to-API unit conversion factor from the master calibration in API cps, and Assigned_blanket_activity is the assigned "golden" blanket activity value in API units.

After PRESGR has been determined for a given tool design or configuration, it can be used with a blanket activity assigned to a new or "non-reference" field-deployed blanket calibrator to calculate the new calibrator's equivalent assigned blanket reference value (SGRREF), e.g., according to Equation (2):

$$SGRREF = \frac{PRESGR \times \text{Assigned\_field\_blanket\_activity}}{200 \; API} \quad (2)$$

where Assigned_field_blanket_ activity is the assigned value of the new blanket calibrator's activity. The blanket activity value of the new blanket calibrator may be, for example, an API value assigned to the blanket during manufacturing.

A counting rate gain for the tool (or gamma ray detector) in the field may then be computed from SGRREF, e.g., according to Equation (3):

$$\text{Detector\_gain} = \frac{SGRREF}{(\text{Field\_blanket\_CR} - \text{Field\_bkgrd\_CR}) \times \text{Tool\_sensitivity}} \quad (3)$$

where Field_blanket_CR is the counting rate in cps obtained from the tool with the new blanket field calibrator wrapped around it, Field_bkgrd_CR is the corresponding ambient background counting rate (cps), and Tool_sensitivity is the counting rate-to-API unit conversion factor from the master calibration in API/cps.

The counting rate gain of the gamma ray tool/detector may then be used to calculate a calibrated natural gamma ray log (GR) on a depth-by-depth basis, e.g., according to Equation (4):

$$GR = \text{Detector\_gain} \times \text{Detector\_CR} \times \text{Tool\_sensitivity} \quad (4)$$

where Detector_CR is the depth-by-depth detector counting rate in cps.

In one or more embodiments, the response of the above-described gamma ray tool/detector to the reference thorium blanket calibrator referred to in Equation (1) may be simulated based on a Monte Carlo model of the reference blanket calibrator. Such a simulated Monte Carlo response may ignore or exclude contributions from ambient background radiation. Thus, Equation (1) may be simplified according to Equation (5):

$$PRESGR = \frac{\text{Simulated\_blanket\_CR} \times \text{Tool\_sensitivity} \times 200 \; API}{\text{Simulated\_blanket\_activity}} \quad (5)$$

where Simulated_blanket_CR is the Monte Carlo simulated reference thorium blanket counting rate in cps, Simulated_blanket_activity is the assigned API value corresponding to the simulated response of the modeled reference blanket, and Tool_sensitivity is the counting rate-to-API unit conversion factor for the tool design or configuration.

In one or more embodiments, Monte Carlo models of natural gamma ray tools may be generated based on predefined specifications of various logging tool components as well as the source of the gamma rays to be detected. Such a specification may include, for example, descriptions of the various components that make up a logging tool itself along with a description of the gamma ray source. The gamma ray source for a thorium blanket field calibrator may be distributed in a sheet of material comprised of urethane and radioactive monazite sand. The radioactive sheet may be encased in a nylon fabric sleeve. The primary source of gamma rays from radioactive monazite sand generally comes from isotopes belonging to the naturally occurring $^{232}$Th decay series.

A 2.614 MeV gamma ray is the highest energy emission produced by any element in the thorium series. However, thorium blanket spectra obtained with natural gamma ray spectroscopy tools suggest contributions from higher energy events are also counted when a thorium blanket calibrator is placed on the tool. The actual cause of the detected events above 2.614 MeV could not be identified because the pulse height analyzer in this example was not designed to record events above 3 MeV. Higher energy events can only occur because coincidental gamma rays whose combined energy exceeds 2.614 MeV are detected. Such events can be caused by a large gamma ray flux on the detector or by decaying nuclei that emit gamma rays from a cascade decay scheme, where the elapsed time between two or more cascade emissions is notably shorter than the time needed by the detector electronics to resolve them as individual events.

The $^{208}$Tl decay scheme includes cascade gamma rays in combination with its 2.614 MeV emission that can produce summation photopeaks around 3.198 and 3.475 MeV. Coincident summation photopeaks from these transitions is believed to be the cause of the high energy events observed in thorium blanket calibration spectra acquired with natural gamma ray spectroscopy tools. To test this hypothesis, lab experiments may be performed using a neutron-induced gamma ray spectroscopy logging tool operating in passive mode, where only naturally decaying gamma rays are counted instead of neutron induced gamma rays. The tool selected for the experiments may include a pulse-height analyzer that is designed to count gamma rays up to a point that is well beyond the range where any summation events from naturally decaying nuclei can occur, e.g., gamma rays up to approximately 9.5 MeV.

Figure 3:
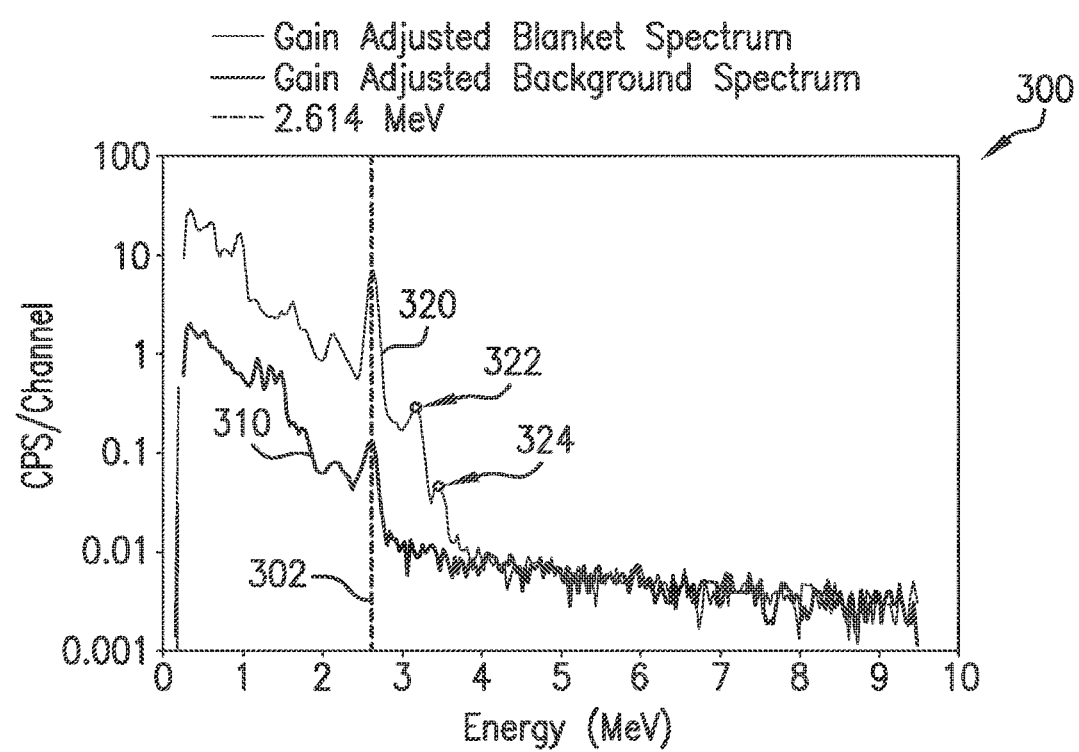
FIG. 3 is a graph of gamma ray energy spectra for a thorium blanket calibrator as measured by a gamma. ray spectroscopy tool over a period of time.
Figure 4:
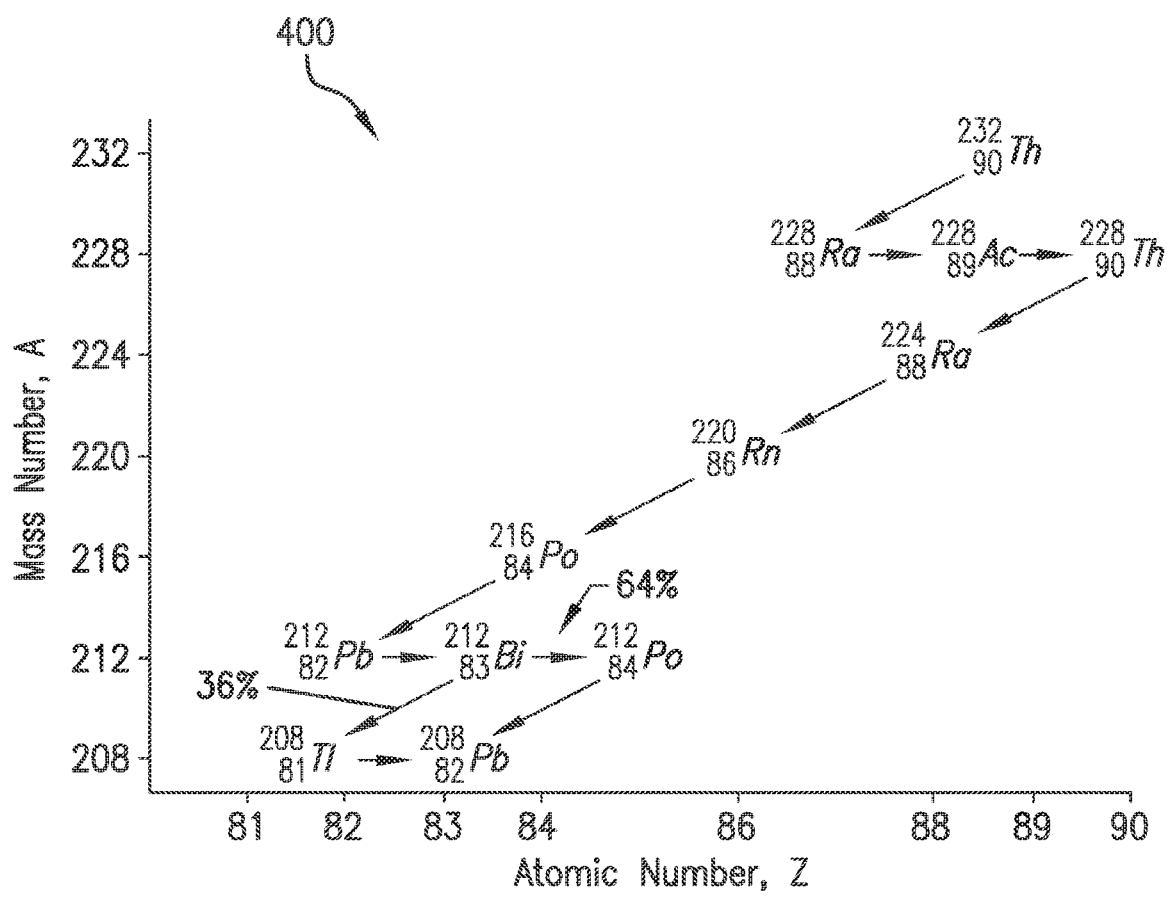
FIG. 4 is a plot of thorium decay chains that produce thorium gamma rays.
Figure 5:
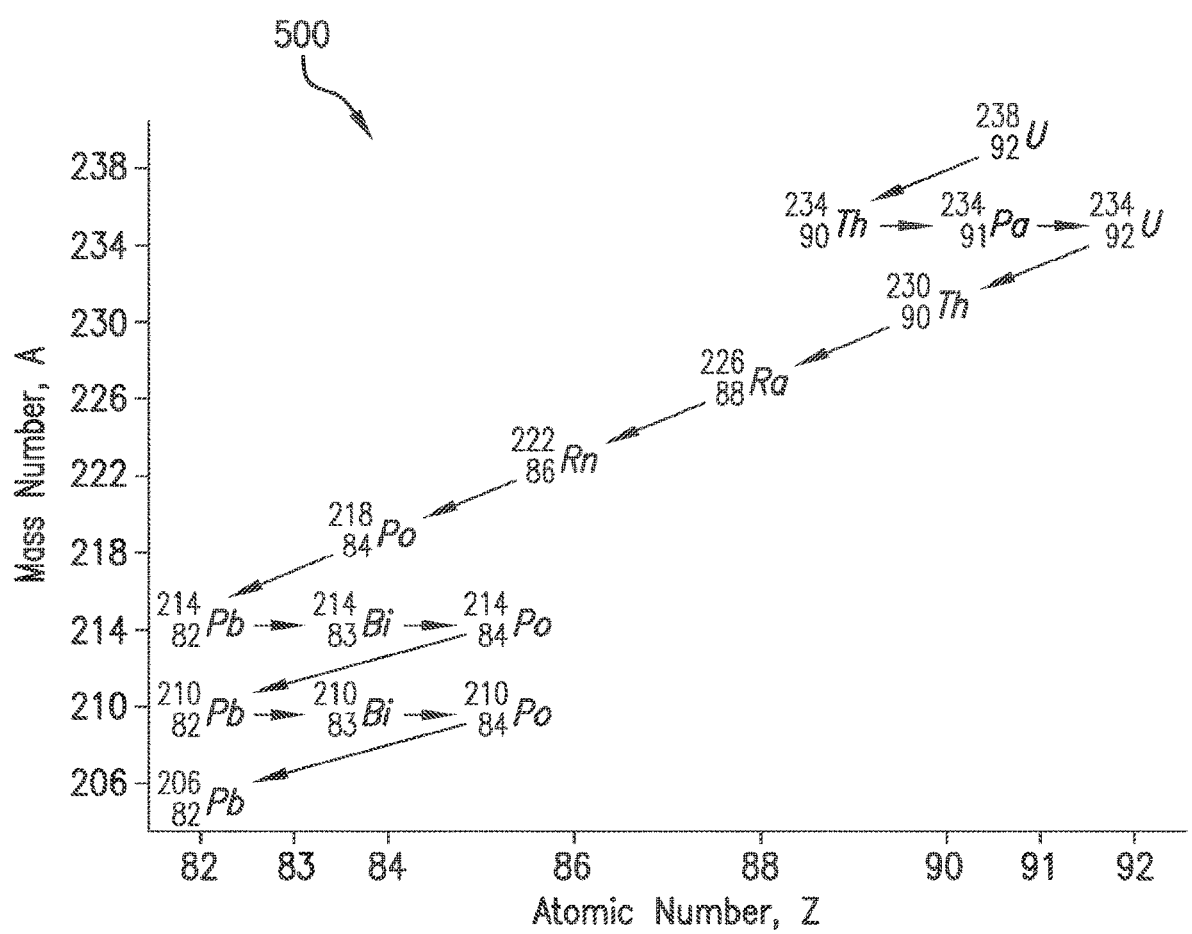
FIG. 5 is a plot of uranium decay chains that produce uranium gamma rays.

FIG. 3 is a graph 300 showing an example of energy spectra that may be recorded by such a gamma ray spectroscopy tool for a thorium blanket calibrator over a period of time, e.g., a one-hour time interval. However, it should be appreciated that the disclosed Monte Carlo modeling techniques are not limited thereto and that these techniques may be applied to other types of field calibrators for gamma ray tools. Thus, the energy emission values for the energy spectra shown in FIG. 3 may be appropriately adjusted for any of various types of gamma ray sources and field calibrators, as desired for a particular implementation.

As shown in FIG. 3, graph 300 includes a curve 310 representing an ambient background spectrum and a curve 320 representing the tool's response with a reference blanket calibrator wrapped around the tool. The reference blanket calibrator may be, for example and without limitation, a large wireline reference thorium blanket calibrator that tightly wraps around the tool. A vertical line 302 indicates the location of the highest energy emission (2.614 MeV) for thorium series gamma rays in both spectra. Two prominent summation photopeak features appear at points 322 and 324 in the blanket spectrum in the vicinity of the anticipated 3.198 and 3.475 MeV locations, respectively. The presence of such photopeaks confirms that the high energy events observed with natural gamma ray spectroscopy tools are caused by coincident summation events from $^{208}$Tl cascade decay emissions.

However, the observed coincident summation photopeaks of the blanket spectrum as shown in FIG. 3 may be problematic from a Monte Carlo modeling perspective. Successful simulation of thorium blanket calibrator responses may require a Monte Carlo model that allows the cascade decay events observed in a thorium blanket calibrator's spectra to be correctly simulated. In one or more embodiments, such a simulation may be performed based on models generated using a Monte Carlo code executable by a computer system (e.g., computers 144 and 244 of FIGS. 1 and 2, respectively) for calibrating gamma ray downhole tools in the field.

In one or more embodiments, the Monte Carlo code may be based on the Monte Carlo N-Particle (MCNP) computer code developed by the Los Alamos National Laboratory for simulating the transport of gamma rays through a three-dimensional geometry and their subsequent detection by a logging tool. As such, it has gained favor and it is widely used throughout the petroleum logging industry. However, standard versions of MCNP are restricted in their ability to simulate some situations involving gamma ray sources in the real world, because they can only consider one source particle per calculation history and they do not support time or space correlated emissions. Thus, the cascade decay events observed in thorium blanket calibrator spectra cannot be simulated with standard versions of MCNP.

In one or more embodiments, an extended version of the MCNP code, e.g., the MCNP-CP code published by Dr. Andrey Berlizov of the International Atomic Energy Agency (IAEA) in Vienna, Austria, may be used to simulate complex decay schemes of actual gamma ray sources in the real world. Such an extended MCNP code may be used to simulate photons, β-particles, discreet energy electrons, and X-rays in one or more simulation runs. The extended MCNP code may also be used to simulate space and time correlated particles from cascade transitions.

Radioactivity from the monazite sand in thorium blanket calibrators is derived from naturally occurring thorium and uranium decay chains. Monazite sand typically has a $ThO_2$/$U_3O_8$ percent mass ratio of 9.7/0.37 which is helpful to define an isotope decay sampling probability distribution for MCNP-CP when modeling a thorium blanket calibrator. Thorium and uranium gamma rays originate from complex decay chains, as shown in plots 400 and 500 of FIGS. 4 and 5, respectively, where decay product isotopes are assumed to exist in a state of secular equilibrium. A multitude of gamma rays are emitted from numerous isotopes in the respective decay chains that combine to produce observed responses to each decay chain parent element. The thorium (Th) series emanates from the decay $^{232}$Th. Natural uranium (U) decays by way of two decay series; one emanating from $^{238}$U and the other from $^{235}$U. Of these, the $^{238}$U decay chain is the most important because $^{235}$U amounts to approximately 0.72% of natural uranium atoms compared to 99.2745% for $^{238}$U.

Numerous photon emissions are produced from the decay processes in the thorium and uranium decay chains. Approximately 362 separate photon emissions, excluding X-rays, are produced by isotopes in the thorium decay series according to information contained in the Table of Radioactive Isotopes. Similarly, approximately 898 photon emissions are produced from decays comprising the uranium series. To simulate photon emissions from thorium and uranium, probability distributions may be constructed to sample the isotopic decays belonging to the decay chains according to their contribution to the total emissions from the decay chain, The MCNP-CP code samples source gamma rays from the sampled isotopes according to isotopic gamma. ray emission probability distributions based on the Evaluated Nuclear Structure Data File (ENSDF) nuclear data library.

Many of the decay chain photon emissions are not important to the simulation of logging tool responses and can be discriminated to aid computational efficiency. For example, isotopes that do not have at least one emission that accounts for at least 0.4% of the total emissions from the decay chain were discriminated. This reduces the total number of isotopes that must be sampled while ensuring that the most important gamma ray emissions are well-sampled. Experience has shown that good fidelity with experimental results can be achieved by sampling gamma rays from decays of the $^{228}$Ac, $^{224}$Ra, $^{212}$Pb, $^{212}$Bi, and $^{208}$Tl isotopes for the thorium chain and the $^{234m}$Pa, $^{236}$Ra, $^{214}$Pb, and $^{214}$Bi isotopes for the uranium chain.

To simulate the radioactivity of the thorium blanket calibrator, the isotopes comprising the thorium and uranium chains are sampled according to the specific photon activities and concentrations of the elements. Specific photon activities ($P_\gamma$) may be calculated based on a secular decay series consisting of k isotopes, e.g., using Equation (6):

$$P_\gamma = A_{sp} \sum_{j=1}^{k} \left( B(j) \sum_{i=1}^{n(k)} I_i \right) \quad (6)$$

where $A_{sp}$ is the specific activity of the decay series element, in Bq/gm, B(j) is the branching ratio, or fraction of decays taking a particular path for isotope j, and $I_j$ is the intensity of gamma emission i from isotope j expressed in photons/decay, and n is the number of discrete gamma rays emitted for each isotope. Equation (6) may represent a generalized equation for the secular decay series in this example.

Based on information gathered from the Table of Radioactive Isotopes, the calculated specific photon activities for the thorium and uranium decays series are 10582.4348 photons/sec/gm Th, and 28115.737 photons/sec/gm U. For a blanket calibrator containing 3300 parts-per-million (ppm) thorium and 121.527 ppm uranium, the specific photon activities needed to sample the respective decay chain isotopes can be calculated according to Equation (7) as follows:

0.0033 gm Th/gm×10582.4348 Th photons/sec/gm Th=34.922 photons/sec/gm 0.0001215 gm U/gm×28115.737 U photons/sec/gm U=3.417 photons/sec/gm    (7)

In one or more embodiments, photon activities from Equation (7) may be used to define a probability distribution for sampling the isotopes comprising the thorium and uranium series. For example, the calculation of photon activities based on such a probability distribution may involve sampling thorium isotopes 91.1% of the time and sampling uranium isotopes 8.9% of the time.

Sampling among the isotopes comprising the thorium and uranium decay chains is defined according to their specific isotopic photon activities. Specific isotopic photon activities ($P_1$) for each isotope in the decay chains may be calculated using Equation (8):

$$P_I = R_{sp} B_I \sum_{i=1}^{n} I_i \quad (8)$$

where $R_{sp}$ is the isotopic relative specific activity within the decay chain, $B_1$ is the branching ratio, or fraction of parental decays taking a path to the isotope, and $I_i$ is the intensity of gamma emission i from the isotope expressed in photons/decay, and n is the number of discrete gamma rays emitted from the isotope.

For thorium in secular equilibrium conditions, the calculated specific isotopic photon activities are 1,0949, 0.0412, 0.4732, 0.1273, and 0.2959 photons/Th decay from $^{228}$Ac, $^{224}$Ra, $^{212}$Pb, $^{212}$Bi, and $^{208}$Tl, respectively. Similar calculations for uranium lead to specific isotopic photon activities of 0.0166, 0.036, 0.7218, and 1.3221 photons/U decay for the $^{234}$Pa, $^{226}$Ra, $^{214}$Pb, and $^{214}$Bi isotopes. The probability distribution for sampling the thorium and uranium decay chain isotopes may be determined for the thorium blanket example above according to the following set of Equations (9):

$$\left.\begin{array}{l} \frac{1.0949}{2.0325}\, ^{228}Ac \text{ photons}/Th \text{ photon} \times \\ 0.911\, Th \text{ photons/photon} = 0.4907\, ^{228}Ac \text{ photons/photon} \\ \frac{0.0412}{2.0325}\, ^{224}Ra \text{ photons}/Th \text{ photon} \times \\ 0.911\, Th \text{ photons/photon} = 0.0185\, ^{224}Ra \text{ photons/photon} \\ \frac{0.4732}{2.0325}\, ^{212}Pb \text{ photons}/Th \text{ photon} \times \\ 0.911\, Th \text{ photons/photon} = 0.2121\, ^{212}Pb \text{ photons/photon} \\ \frac{0.1273}{2.0325}\, ^{212}Bi \text{ photons}/Th \text{ photon} \times \\ 0.911\, Th \text{ photons/photon} = 0.0571\, ^{212}Bi \text{ photons/photon} \\ \frac{0.2959}{2.0325}\, ^{208}Tl \text{ photons}/Th \text{ photon} \times \\ 0.911\, Th \text{ photons/photon} = 0.1325\, ^{208}Tl \text{ photons/photon} \\ \frac{0.0166}{2.0965}\, ^{234m}Pa \text{ photons}/U \text{ photon} \times \\ 0.089\, U \text{ photons/photon} = 0.0007\, ^{234m}Pa \text{ photons/photon} \\ \frac{0.0360}{2.0965}\, ^{226}Ra \text{ photons}/U \text{ photon} \times \\ 0.089\, U \text{ photons/photon} = 0.0015\, ^{226}Ra \text{ photons/photon} \\ \frac{0.7218}{2.0965}\, ^{214}Pb \text{ photons}/U \text{ photon} \times \\ 0.089\, U \text{ photons/photon} = 0.0307\, ^{214}Pb \text{ photons/photon} \\ \frac{1.3221}{2.0965}\, 214Bi \text{ photons}/U \text{ photon} \times \\ 0.089\, U \text{ photons/photon} = 0.0562\, ^{214}Bi \text{ photons/photon} \end{array}\right\} \quad (9)$$

The results on the right-hand side of Equations (9) above define the probability distribution for sampling decays of the isotopes selected to represent the thorium and uranium decay chains according to the chosen thorium and uranium elemental concentrations of the calibrator. In this example, $^{228}$AC decays would be sampled 49.07% percent of the time, $^{224}$Ra decays would be sampled 1.85% of the time, $^{212}$Pb would be sampled 21.21% of the time, and so on for the remaining isotopes. It should be noted that the value of the results defining the probability distribution on the right-hand side of Equations (9) may not change unless Th/U mass ratio in the blanket calibrator radioactive material changes.

MCNP-CP provides a number of functions, or tallies, to count the number of transported particles that score in various ways. For scintillation counters, an "F8 tally" may be used to score the amount of energy deposited in the detector. If a multi-channel pulse-height spectrum is desired, then a set of energy bins, or channels, may be specified, and the tally will capture the number of events that score in each channel. A bookkeeping function of MCNP-CP may be employed to count the number of scoring events per particle tracked. Thus, a unit conversion may be applied to the tally results so that the results may be expressed in terms of counting rates that can be compared directly with experimental data. The conversion may be handled using MCNP-CP based on a specified tally multiplier that is appropriate to the particular simulation.

In one or more embodiments, the tally multiplier ($M_T$) may be calculated using Equation (10) as follows:

$$M_T = A_s V_s \rho_b \quad (10)$$

where $A_s$ is the total photon specific activity of the simulated source in photons/sec/gm, $V_s$ is the sampled volume of the source region in cm$^3$, and $\rho_b$ is the bulk density of the radioactive source material in gm/cm$^3$. For a given source mixture, $A_s$ is the sum of the elemental photon specific activities, i.e., the sum of the right hand side of equation 7. $V_s$ is easily calculated from the physical dimensions of the sheet of radioactive material in the thorium blanket. The bulk density ($\rho_b$) may be computed from the mass fractions representing the thorium and uranium concentrations in the blanket, the monazite sand $ThO_2/U_3O_8$ mass ratio, and the respective bulk densities of the monazite sand and the urethane binder.

Figure 6:
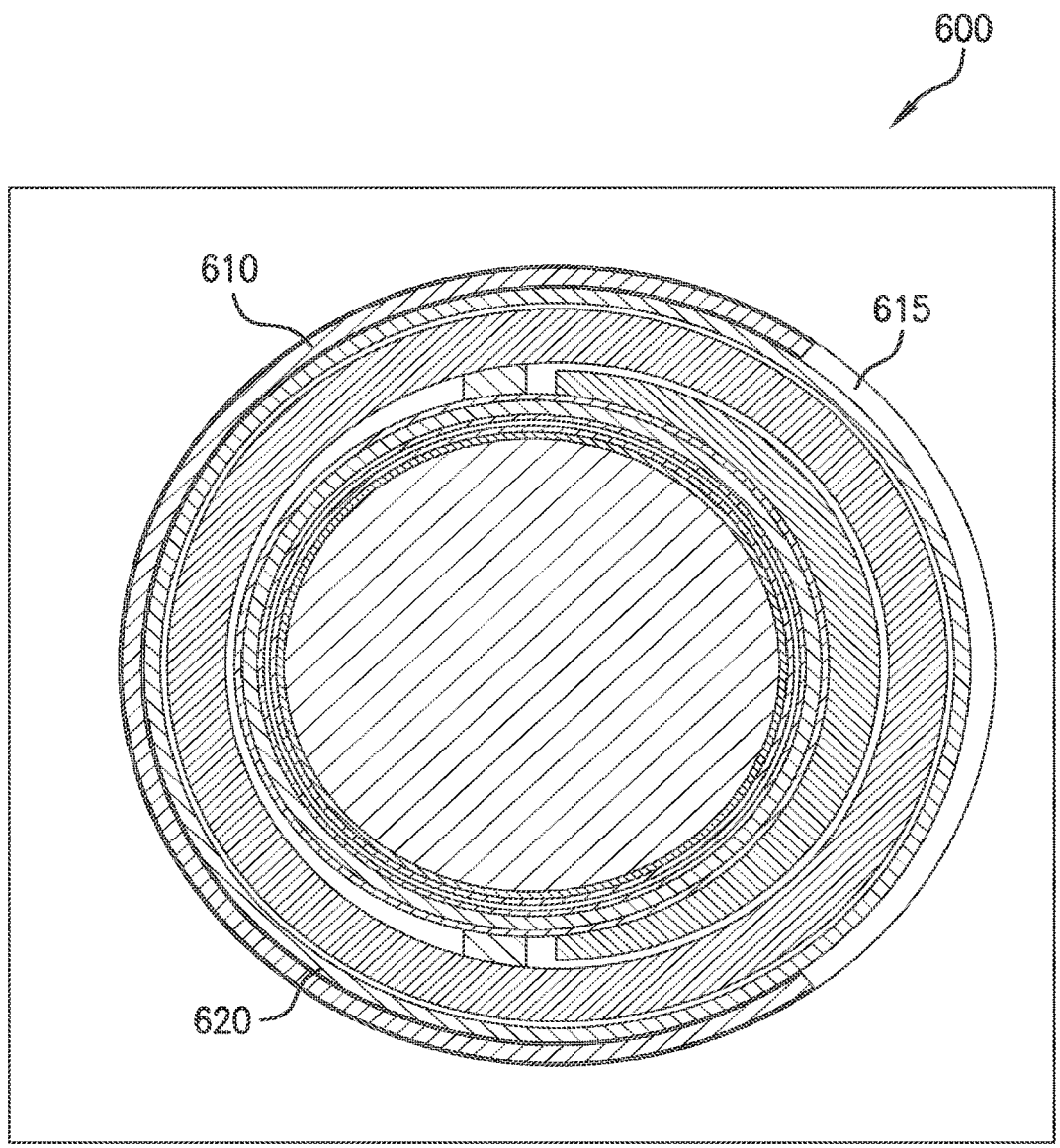
FIG. 6 is a cross-sectional view of a thorium blanket wrapped around a gamma ray spectroscopy tool.

FIG. 6 is a cross-sectional view 600 of an illustrative thorium blanket 610 wrapped around a gamma. ray spectroscopy tool 620. Gamma ray tool 620 may be, for example, a wireline gamma ray logging tool, e.g., downhole tool 232 of FIG. 2, as described above. Thorium blanket 610 in this example may be a wireline thorium blanket calibrator that can be wrapped around gamma ray tool 620 for purposes of field calibration. However, due to the particular design or dimensions of thorium blanket 610, it may not fully enclose gamma ray tool 620. Thus, as shown in FIG. 6, a gap 615 may be produced in an area between the long edges of the blanket's radioactive sheet when it is wrapped around gamma ray tool 620.

In one or more embodiments, a model of thorium blanket 610 may be used with the MCNP-CP code described above to randomly sample the starting location of source particles from the region and volume occupied by a radioactive sheet of thorium blanket 610. Such a Monte Carlo model may be generated based on a description of thorium blanket 610 that accurately represents the geometry and orientation of the actual thorium blanket calibrator when placed on the gamma ray tool. A thorium blanket model developed from such a geometry description may be used to simulate the thorium blanket response of gamma ray tool 620 even in cases where the tool's azimuthal sensitivity for detecting gamma rays is not uniform. For example, the thorium blanket 610 may be oriented so that gap 615 between the edges of the blanket's radioactive sheets is aligned with the least sensitive azimuth of gamma ray tool 620 for detecting gamma rays. A similar orientation of thorium blanket 610 may be used for lab experiments with gamma ray tool 620 to count naturally decaying gamma rays, as described above. It should be appreciated that the azimuthal orientation of a thorium blanket calibrator may be relevant to only those configurations of wireline natural gamma ray tools that have azimuthally sensitive gamma ray detectors.

Figure 7:
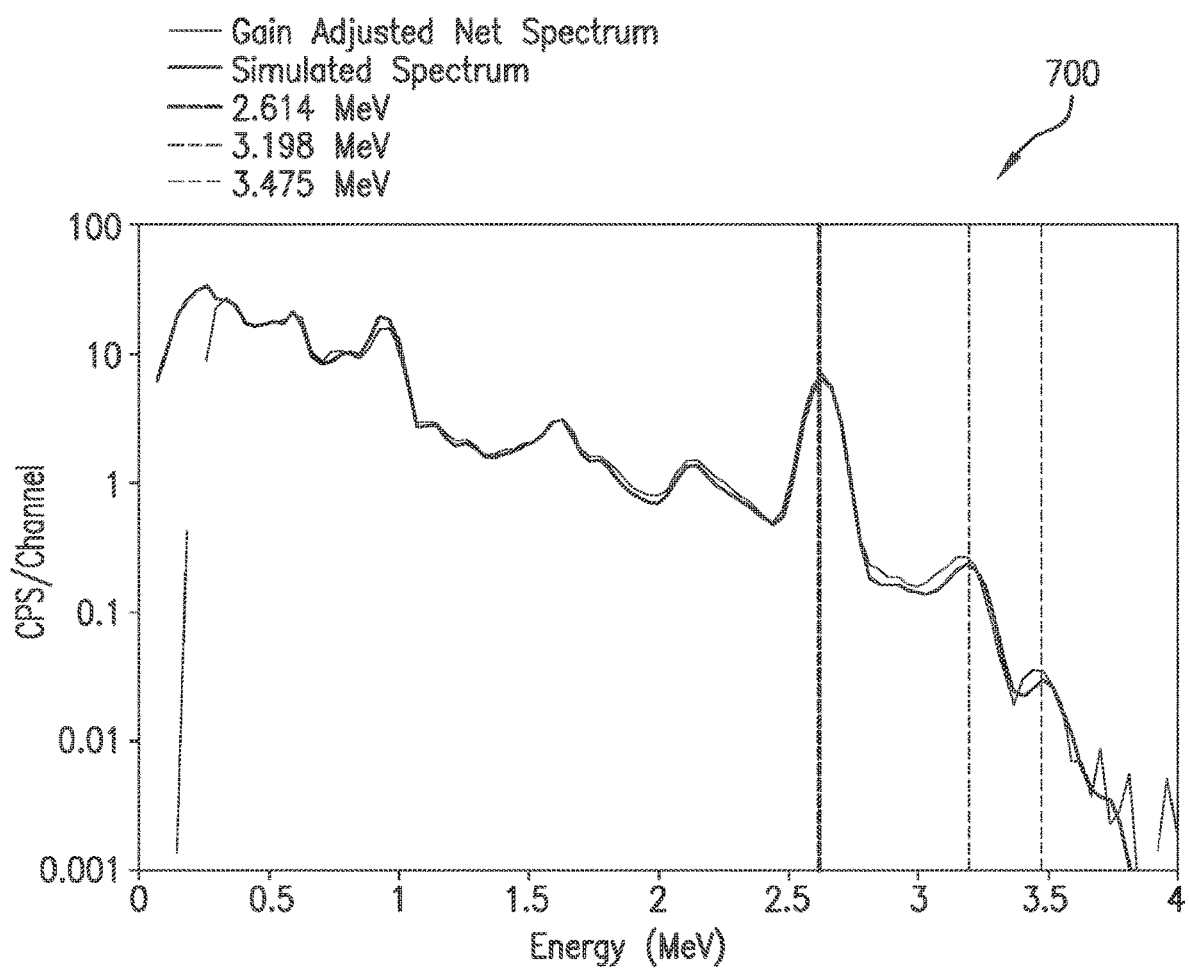
FIG. 7 is a plot showing a comparison between a net gamma-ray energy spectrum based on the measured spectra for the thorium blanket of FIG. 3 and a simulated spectrum based on a Monte Carlo model of the thorium blanket.

FIG. 7 is a plot 700 showing an overlay of a Monte Carlo simulated spectrum and a net thorium blanket calibrator spectrum based on the measured spectra obtained from a gamma ray tool, e.g., as shown in plot 300 of FIG. 3 described above. As shown in FIG. 7, a relatively good match between the simulated spectrum and the measured data may be achieved, e.g., after one or more iterations on the thorium concentration in the blanket material. Such results may validate the source definition and also, verify that the MCNP-CP code can be used to simulate the complex decay processes and correlated particle events that occur when using thorium blanket calibrators on logging tools.

The thorium blanket calibrator used with the gamma ray logging tool to obtain the net blanket spectrum shown in FIG. 7 may be a reference blanket used with various wireline natural gamma ray tools. The source definition, tally multiplier, and radioactive material description that produced the simulated spectrum may be used to simulate the net calibrator counting rate for a particular gamma ray tool design or configuration. Ideally, the simulated counting rate for the tool design or configuration should closely match (or be within a desired error tolerance of) the net blanket counting rate obtained from a real-world or empirical master calibration of the tool design/configuration performed with the same reference blanket. In one or more embodiments, such a simulated counting rate may be obtained based on a valid Monte Carlo model of the thorium blanket calibrator. Such a model of the thorium blanket may be developed by performing the following operations:

calculating specific photon activities for the thorium and uranium decay chains;

calculating source strength specific photon activities for thorium and uranium by combining elemental specific activities and elemental concentrations;

defining a mixed-source probability distribution to sample from the thorium and uranium decay chains;

assembling a list of isotopes whose gamma ray emissions are important to simulating the thorium and uranium decay chains;

calculating specific photon activities for each isotope selected to simulate the thorium and uranium decay chains;

defining a mixed-source probability distribution to sample isotopic decays from the thorium and uranium decay chains by combining isotopic specific photon activities and the decay chain mixed-source probabilities; and calculating and applying a factor to convert simulated MCNP-CP tally results into absolute counting rates.

The above-described Monte Carlo model may then be used to simulate the responses of gamma ray logging tools for field calibration of the tools in any of various mixed-source environments, including, for example, the API gamma ray pit of the API Calibration Facility described previously.

An example of applying the disclosed field calibration techniques to calibrate the responses of various wireline natural gamma ray tool configurations will be described below with respect to FIGS. 8A, 8B, 9A and 9B. For purposes of this example, it is assumed that a group of thorium blanket calibrators was assembled for collecting lab measurements with a particular configuration of a natural gamma ray telemetry tool (or "GTET tool"). However, it should be appreciated that embodiments are not intended to be limited thereto and that the disclosed embodiments may be applied to other wireline gamma ray tool configurations and/or designs in addition to any of various gamma ray LWD tool configurations/designs. The group of thorium blankets in this example may include the reference blanket used to obtain the net blanket spectrum shown in FIG. 7, as described above, and at least five other blankets that were manufactured by various vendors and that have different assigned API values. It may be assumed that the reference blanket was used to calibrate the GTET tool and that the gain-corrected net blanket counting rates for all six blankets were obtained using the calibrated GTET tool. Also, for purposes of this example, it is assumed that the net blanket counting rates for seven additional blankets spanning a wide range of assigned API values was obtained from a database including shop calibrations of various field-deployed GTET tools.

Figure 8A:
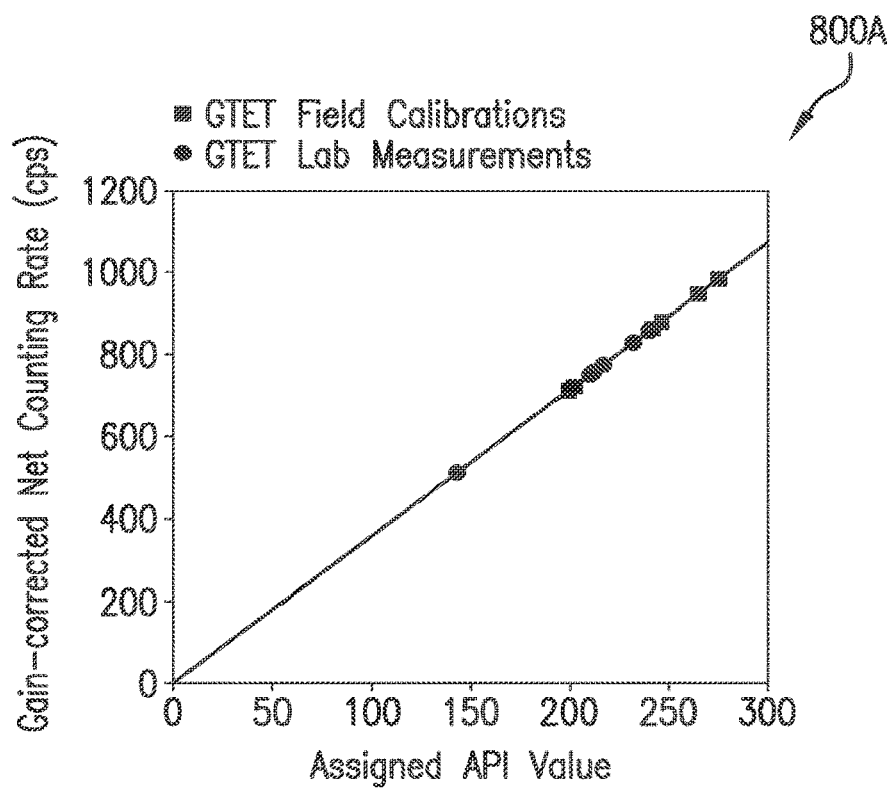
FIGS. 8A and 8B are plots of counting rate data obtained from lab measurements and field calibrations using GTET and H4TG tools, respectively.
Figure 8B:
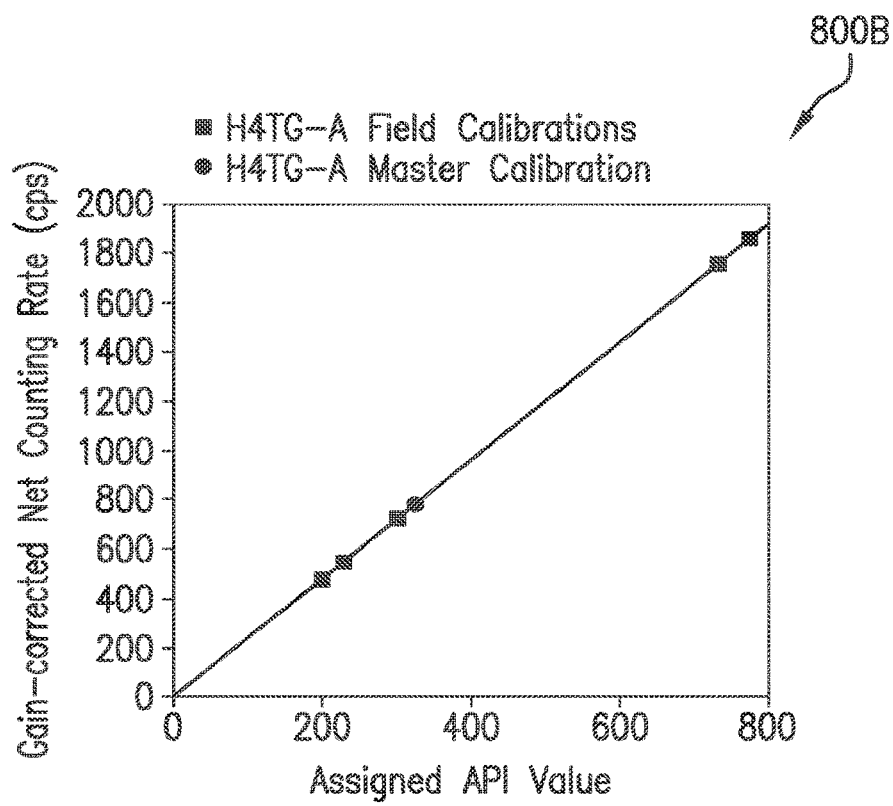

FIG. 8A is a plot 800A of the net blanket counting rates obtained from the GTET lab measurements and field calibrations. FIG. 8B is a plot 800B of the net blanket counting rates obtained from a master calibration of a different gamma ray tool (e.g., the Hostile Quad Telemetry Gamma (H4TG™) gamma ray tool from Halliburton Energy Services, Inc. of Houston, Tex.) and five field shop calibrations. As expected, the results show linear relationships between the tool response and the blanket activity expressed in API units.

The tally multiplier ($M_T$) for a gamma ray tool response, as determined using Equation (10) above, represents the number of source photons created per second. Because it represents the source activity, the tally multiplier varies with the assigned blanket activity in API units. After a successful correspondence is established between a tally multiplier and a blanket's assigned API value, blanket responses for different API value may be modeled using a source definition whose tally multiplier ($M_{T2}$) is proportional to the ratio of the two API values, e.g., according to Equation (11):

$$M_{T2} = M_{T1} \frac{API_2}{API_1} \quad (11)$$

where $M_{T1}$ is a tally multiplier that successfully reproduces the blanket response produced by a blanket calibrator whose assigned API value is $API_1$ and $API_2$ is the API value of a different blanket. The thorium concentration in the blanket is the controlling variable in the tally multiplier calculation because it sets the total photon specific activity as well as the bulk density of the radioactive sheet material through its link to the mass of monazite sand in the sand-urethane mixture. In other words, changing the thorium concentration to achieve a desired tally multiplier also leads to a change in the density and material description for the monazite sand-urethane radioactive sheet in the Monte Carlo model.

To test these concepts, source descriptions may be computed for the large wireline blankets listed in the table below by using the assigned API value of 232 API for TB30 and the tally multiplier that successfully reproduced the GTET master calibration net calibration blanket counting rate. Monazite sand-urethane mixture material descriptions may be prepared to represent the required thorium concentration for each tally multiplier. Then, the MCNP-CP code may be used to simulate thorium blanket calibrator counting rates for each blanket. A tally multiplier for the small reference wireline blanket may be found by iterating on its thorium concentration until a satisfactory match with the master calibration net blanket counting rate for a particular gamma ray tool, e.g., the H4TG tool described above. This tally multiplier and the assigned API value of 325 API for TB346 may be used to perform Monte Carlo simulations for the small wireline blankets listed in Table 1 below by following the same procedure as that used for the large blankets.

TABLE 1

| Blanket ID | Blanket Size | Assigned API Value | Gain-corrected Net Blanket Counting Rate (cps) | Modeled Counting Rate (cps) | Percent Difference |
|---|---|---|---|---|---|
| TB30 | Large | 232 | 829.0 | 830.32 | 0.159 |
| TB28 | Large | 216 | 774.4 | 777.26 | 0.019 |
| USC-002-CB | Large | 143 | 511.53 | 511.54 | 0.002 |
| 2141 | Large | 246 | 879.03 | 876.57 | 0.280 |
| TB155 | Large | 275 | 982.65 | 982.92 | 0.027 |
| TB770 | Large | 199 | 711.08 | 711.14 | 0.008 |
| SA-8 | Large | 202 | 721.8 | 722.04 | 0.033 |
| TB275 | Large | 242 | 864.73 | 865.00 | 0.031 |
| TB146 | Large | 265 | 946.92 | 947.09 | 0.019 |
| TB346 | Small | 325 | 779.24 | 778.89 | 0.046 |
| TB766 | Small | 199 | 477.14 | 477.0 | 0.028 |
| 2193 | Small | 229 | 549.07 | 548.89 | 0.032 |
| TB751 | Small | 775 | 1858.2 | 1855.96 | 0.120 |
| TB345 | Small | 301 | 721.7 | 721.39 | 0.43 |
| TB747 | Small | 732 | 1755.1 | 1753.12 | 0.113 |

Figure 9A:
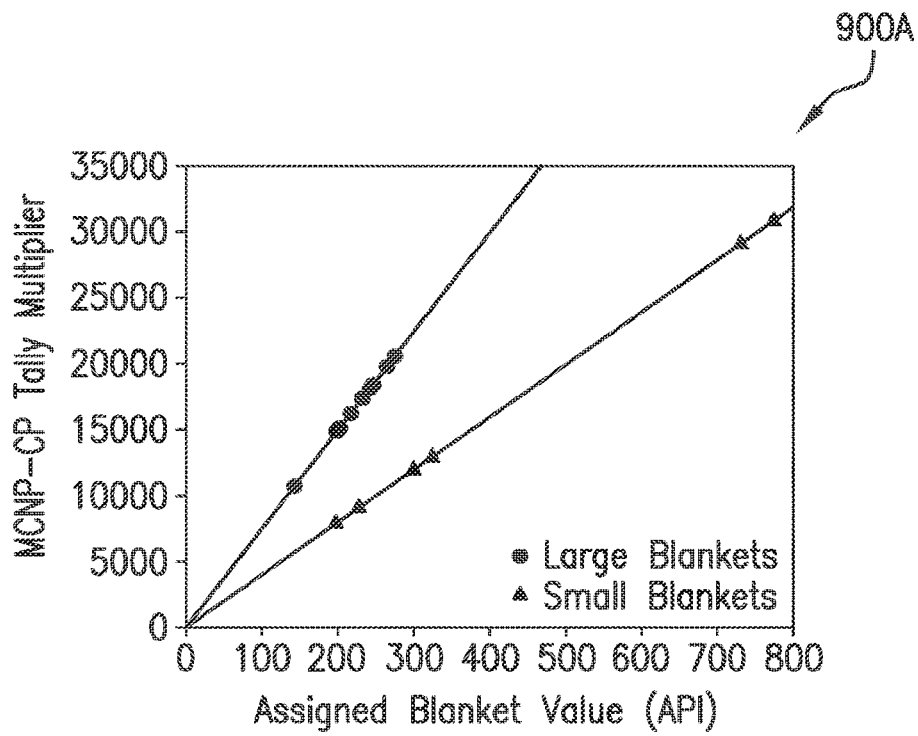
FIG. 9A is a plot of tally multipliers for large and small blankets relative to assigned American Petroleum Institute (API) blanket values.
Figure 9B:
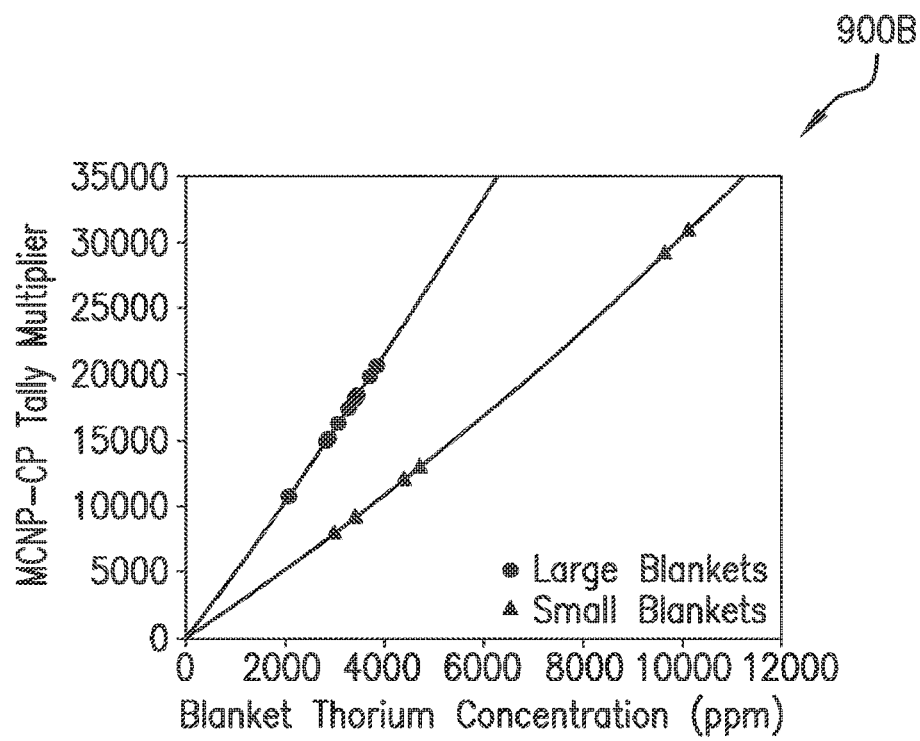
FIG. 9B is a plot of tally multipliers for large and small blankets relative to blanket thorium concentration.

FIG. 9A is a cross-plot 900A of the computed tally multipliers for both large and small sets of blankets versus the assigned blanket API values. As expected, the linear relationships between the computed tally multipliers and the assigned blanket API unit activity values produce very good matches to observed net blanket counting rates as shown in Table 1 above. FIG. 9B is a cross-plot 900B of the computed tally multipliers versus the blanket thorium concentration for the large and small sets of blankets. In contrast with the computed tally multipliers shown in cross-plot 900A of FIG. 9A, linear relationships do not exist between the computed tally multipliers and the blanket thorium concentration shown in cross-plot 900B of FIG. 9B. Instead, a slightly non-linear relationship occurs between these quantities, because the density of the radioactive monazite sand-urethane mixture varies as a function of thorium concentration.

The reference blanket source definitions, monazite sand-urethane material descriptions, and tally multipliers may then be used to simulate responses for various configurations of wireline natural gamma ray tools. Table 2 below shows the simulation results for three configurations of the GTET tool, two configurations of the H4TG tool, and a configuration for a third gamma ray tool, e.g., the UltraSlim™ Quad Telemetry Gamma (S4TG™) tool from Halliburton Energy Services, Inc. of Houston, Tex.

TABLE 2

| Tool | OD (in.) | Housing Material | Blanket Size | Gain-corrected Net Blanket Counting Rate (cps) | Modeled Counting Rate (cps) | Percent Difference |
|---|---|---|---|---|---|---|
| SP GTET | 3.625 | 17-4 SS | Large | 829.0 | 830.32 | 0.159 |
| Flasked GTET | 3.73 | Inconel 718 | Large | 796.0 | 789.07 | 0.87 |
| UHP GTET | 4.44 | 17-4 SS | Large | 480.7 | 484.91 | 0.87 |
| H4TG-A | 2.75 | 17-4 SS | Small | 779.24 | 778.89 | 0.05 |
| H4TG-B | 3.125 | 17-4 SS | Small | 624.22 | 606.7 | 2.85 |
| S4TG | 2.35 | 17-4 SS | Small | 963.4 | 966.66 | 0.34 |

Figure 10:
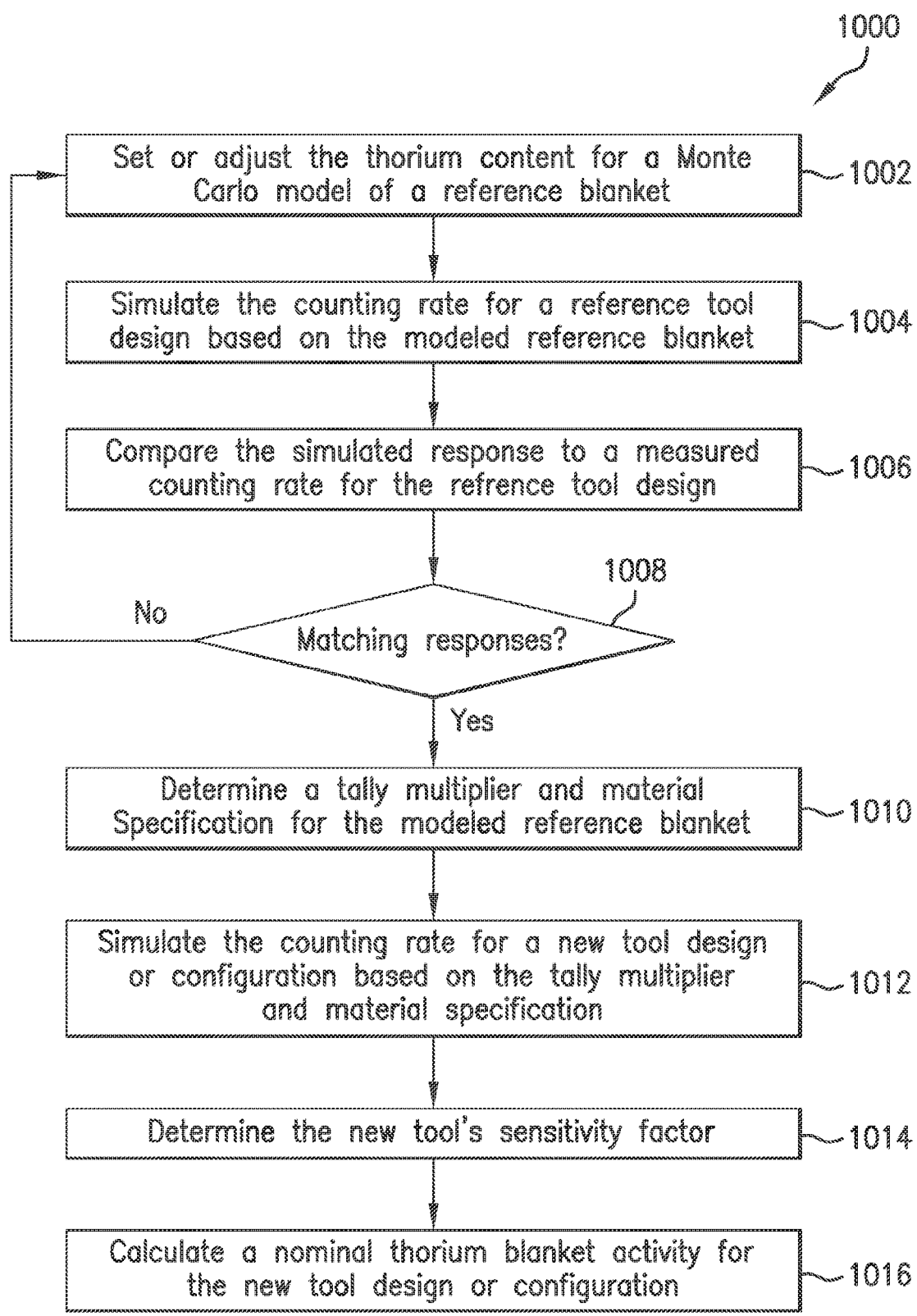
FIG. 10 is a flow chart of an illustrative process for determining an equivalent nominal blanket activity for calibrating new gamma ray tool designs or configurations.

FIG. 10 is a flow chart of an illustrative process 1000 for determining an equivalent nominal blanket activity for a gamma ray tool design or configuration. For example, process 1000 may be used to determine the equivalent nominal blanket activity for tools that cannot be calibrated at the API gamma ray pit. As will be described in further detail below, process 1000 allows simulated net blanket counting rates to be used in place of those that would be measured for a specified assigned blanket API value.

As shown in FIG. 10, process 1000 begins in block 1002, which includes setting or adjusting the thorium content for a Monte Carlo model of a reference thorium blanket. For example, the thorium content may be used to generate a new model of the reference blanket or update an existing model of the reference blanket. The model of the reference blanket may then be used in block 1004 to simulate a counting rate or response of a known (or "reference") tool design or configuration with the reference blanket as the gamma ray source, e.g., with the reference blanket wrapped around the tool as described above. In block 1006, the simulated response or counting rate based on the modeled blanket is compared to a measured counting rate for the reference tool design, e.g., based on lab measurements with the actual reference blanket wrapped around the tool. If it is determined in block 1008 that the simulated response matches the measured counting rate, process 1000 proceeds to block 1010, which includes simulating the reference blanket's response for a new tool design or configuration. Otherwise, process 1000 returns to block 1002. and the operations in blocks 1002, 1004, 1006 and 1008 are repeated over one or more iterations until the simulated response or counting rate is determined in block 1008 to match the measured response/counting rate. By repeating the operations in blocks 1002, 1004, 1006 and 1008, the thorium content of the modeled reference blanket may be iteratively adjusted until the corresponding simulation produces a reference tool response that appropriately matches the tool's measured response, e.g., within a given error tolerance threshold.

Once it is determined in block 1008 that the simulated and measured responses or counting rates match, process 1000 proceeds to block 1010. Block 1010 includes determining a tally multiplier and material specification for the modeled reference blanket. The tally multiplier may be calculated using Equation (10), as described above. The material specification may be, for example, a description of the monazite sand-urethane mixture material of the reference blanket. For the example of the MCNP code described above, the description may include an element-by-element list of atoms together with their corresponding mass or atom fractions comprising the monazite sand-urethane mixture. The mass or atom fractions of each element may be derived from the stochastic chemistry of the mixture. The chemistry of the mixture may be defined by blending monazite sand and urethane to achieve a particular thorium concentration for the mixture in ppm, based on the chemical formulae for monazite sand and urethane along with their respective densities in gram per cubic centimeter (g/cc). As the thorium concentration required to reproduce the measured response may not be known in advance, iteration is used to converge to a satisfactory result.

In block 1012, the tally multiplier and the material specification from block 1010 are used to simulate the counting rate or response for a new tool design or configuration. The simulated counting rate/response is then used in block 1014 to determine the new tool's sensitivity factor. In one or more embodiments, the sensitivity factor for the new tool design or configuration may be determined using empirical techniques, for example, using a standardized empirical calibration process involving the API calibration facility or a proxy thereof.

Alternatively, Monte Carlo modeling techniques may be employed to simulate the responses of the new tool in the API calibration facility or a proxy for it. During the simulation, one or more radioactive zones of a formation may be modeled and the photon (i.e., gamma ray) counting rates may be determined. Using the simulated counting rates, an API unit sensitivity factor for the simulated logging tool may be calculated. For example, a Monte Carlo model of the reference blanket based on the MCNP-CP described above may be used to apply a tally multiplier to convert tally results obtained from the simulation into absolute counting rates. In some implementations, the aforementioned radioactive zones of the formation may correspond to designated high and low activity zones of the gamma ray pit of the API calibration facility (or model thereof). The API unit sensitivity factor in this case may be defined as 1/200th of the difference between counting rates observed in a designated high activity zone of the gamma ray pit and a designated low activity zone of the pit, e.g., as expressed by Equation (12):

$$200/(HAZ_{cps} - LAZ_{cps}) \tag{12}$$

where $HAZ_{cps}$ is the counting rate of the high activity zone (in cps), and $LAZ_{cps}$ is the counting rate of the low activity zone.

As another alternative to using the empirical techniques and/or the Monte Carlo modeling techniques described above, the sensitivity factor of the new tool configuration or design may be determined based on a tally multiplier for a second thorium blanket, as will be described in further detail below with respect to FIG. 11.

Figure 11:
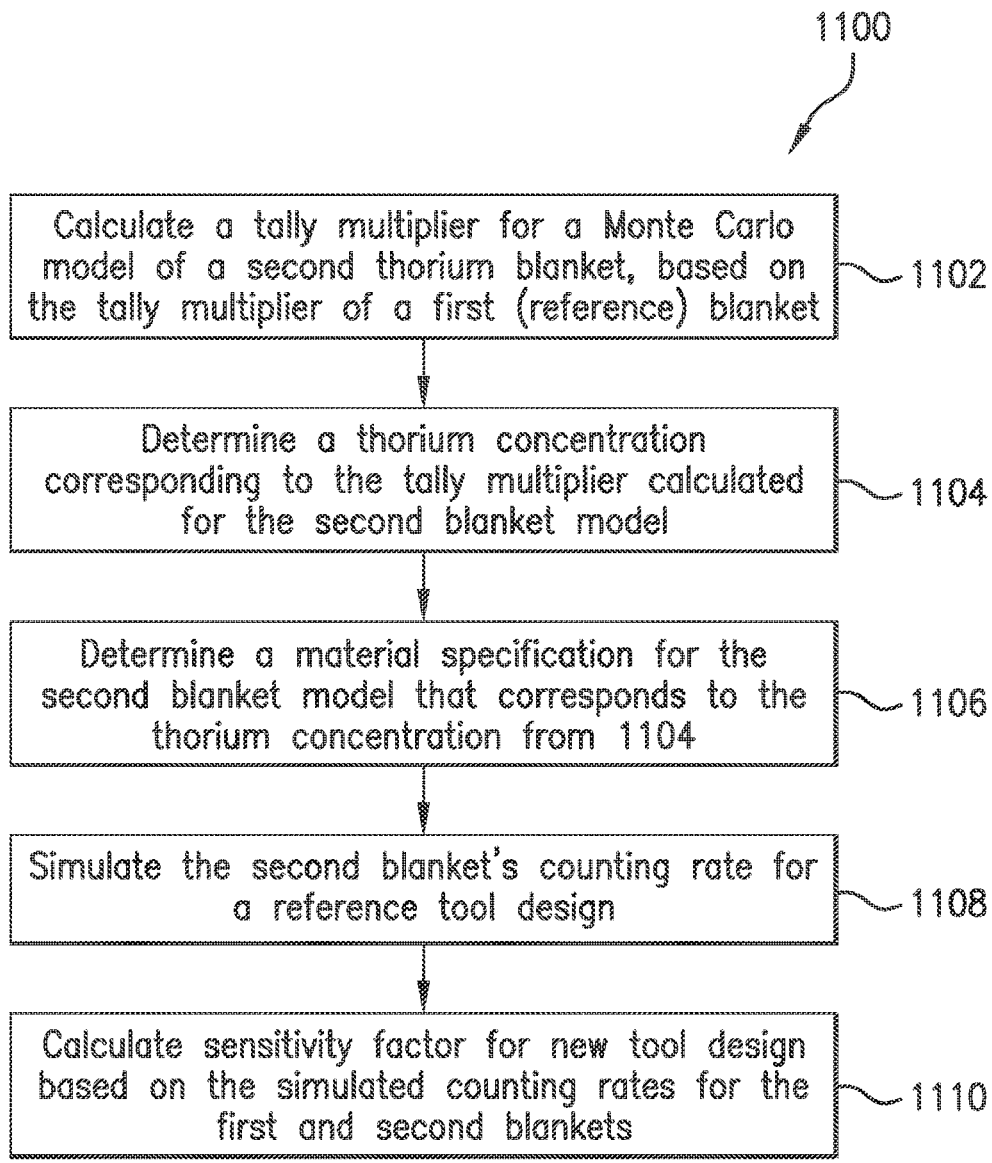
FIG. 11 is a flow chart of an illustrative process for determining a sensitivity factor for a new gamma ray tool design or configuration.

FIG. 11 is a flow chart of an illustrative process 1100 for determining a sensitivity factor for the gamma ray tool design or configuration in block 1014 of process 1000. Process 1100 begins in block 1102, which includes calculating a tally multiplier for a second thorium blanket (or Monte Carlo model thereof). In one or more embodiments, the tally multiplier of the second thorium blanket may be calculated based on the tally multiplier of the reference blanket as determined in block 1010 described above, e.g., using Equation (11). as described above. The second thorium blanket in this example may have an assigned API value (corresponding to $API_2$ in Equation (11)), which is significantly different from that of the reference blanket (corresponding to $API_1$ in Equation (11)).

In block 1104, a thorium concentration that coincides with or corresponds to the tally multiplier calculated in block 1102 is determined for the second thorium blanket model. In block 1106, a material specification or monazite sand-urethane mixture material description corresponding to the thorium concentration from block 1104 is determined for the second blanket model. Process 1100 then proceeds to block 1108, which includes simulating the second blanket's counting rate for the reference tool design, based on the tally multiplier and material specification/description from blocks 1102 and 1106, respectively.

In block 1110, the sensitivity factor of the new tool design is calculated based on the simulated counting rates for the respective first (reference) and second blankets. In one or more embodiments, the new tool's sensitivity factor (or Tool_sensitivity) may be a counting rate-to API unit conversion factor calculated from the two simulated blanket counting rates and their assigned API unit values, e.g., according to Equation (13):

$$\text{Tool\_sensitivy} = \frac{API_1 - API_2}{\text{Simulated\_blanket\_CR}_1 - \text{Simulated\_blanket\_CR}_2} \tag{13}$$

where $API_1$ and $API_2$ are the assigned API unit values of the first and second blankets, respectively, Simulated_blanket_$CR_1$ is the simulated blanket counting rate of the first (or reference) blanket in cps, and Simulated_blanket_$CR_2$ is the simulated blanket counting rate of the second blanket in cps.

Returning back to process 1000 of FIG. 10, the sensitivity factor of the new tool design or configuration as determined in block 1014 is then used in block 1016 to calculate a nominal thorium blanket activity for the new tool, e.g., according to Equation (5), as described above. It should be appreciated that the sensitivity factor in block 1014 may be determined using any one of the three approaches described above, i.e., an empirical calibration process, Monte Carlo modeling with simulated counting rates of a single reference blanket alone, or Monte Carlo modeling with simulated counting rates of two blankets, as in process 1100 of FIG. 11. Thereafter, when an uncalibrated gamma ray tool having the same new design or configuration is deployed in the field, the API unit sensitivity factor may be applied to the tool's counting rate response to thereby convert the tool's response to API units and calibrate the tool without having to resort to the empirical calibration techniques associated with conventional solutions.

The use of Monte Carlo modeling to simulate gamma ray tool responses allows the disclosed calibration techniques to accurately predict the equivalent nominal blanket activity for new tool designs and configurations. Thus, the illustrative digital Monte Carlo models described herein replace the empirical derivation of tool sensitivity factors using the API gamma ray pit and, therefore, also remove its accompanying challenges. Accordingly, the disclosed techniques allow a complete digital replacement for the empirical master calibration process to be achieved, without the challenges associated with the physical gamma ray pit at the API Calibration Facility.

Figure 12:
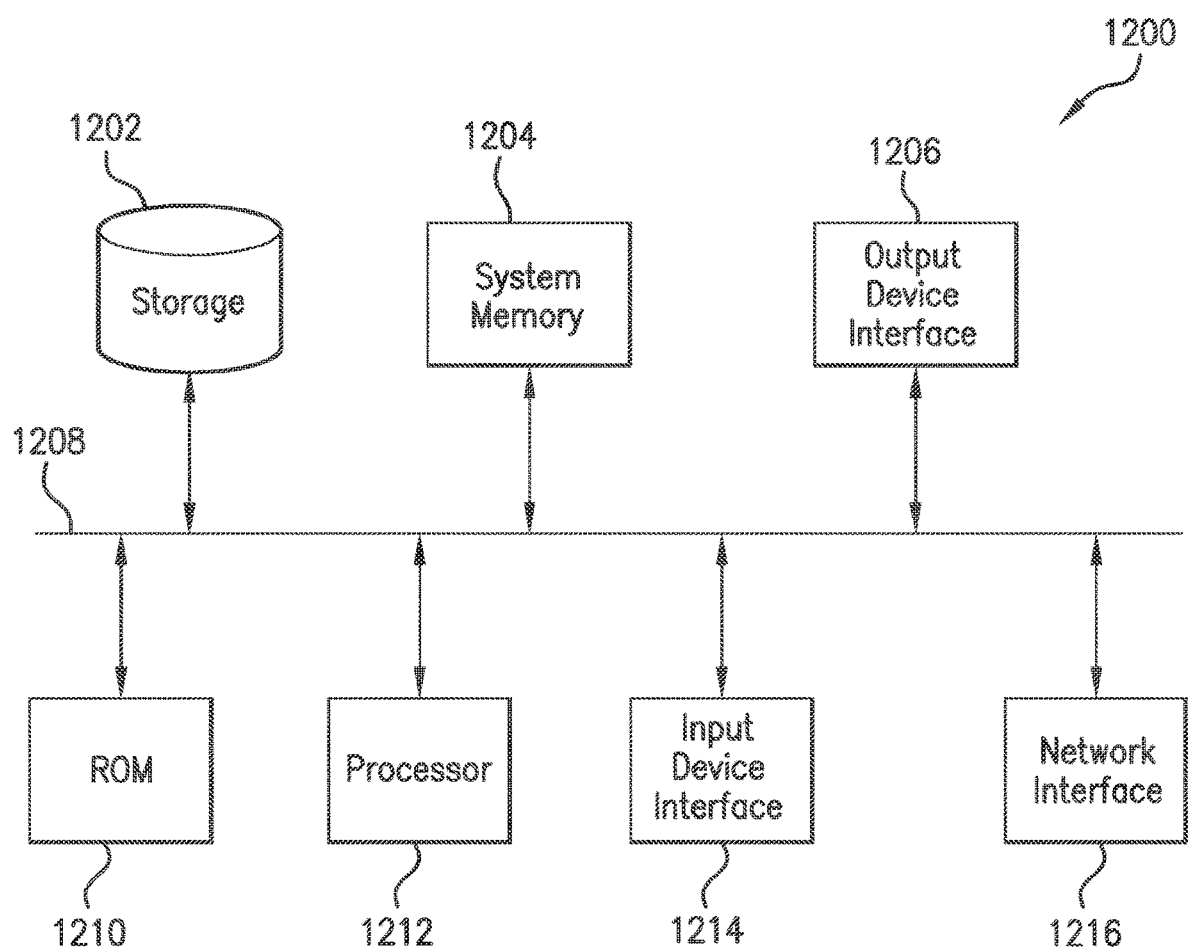
FIG. 12 is a block diagram of an illustrative computer system in which embodiments of the present disclosure may be implemented.

FIG. 12 is a block diagram of an exemplary computer system 1200 in which embodiments of the present disclosure may be implemented. For example, processes 1000 and 1100 of FIGS. 10 and 11, respectively, as described above, may be implemented using system 1200. System 1200 can be a computer, phone, PDA, or any other type of electronic device. Such an electronic device includes various types of computer readable media and interfaces for various other types of computer readable media. As shown in FIG. 12, system 1200 includes a permanent storage device 1202, a system memory 1204, an output device interface 1206, a system communications bus 1208, a read-only memory (ROM) 1210, processing unit(s) 1212, an input device interface 1214, and a network interface 1216.

Bus 1208 collectively represents all system, peripheral, and chipset buses that communicatively connect the numerous internal devices of system 1200. For instance, bus 1208 communicatively connects processing unit(s) 1212 with ROM 1210, system memory 1204, and permanent storage device 1202.

From these various memory units, processing unit(s) 1212 retrieves instructions to execute and data to process in order to execute the processes of the subject disclosure. The processing unit(s) can be a single processor or a multi-core processor in different implementations.

ROM 1210 stores static data and instructions that are needed by processing unit(s) 1212 and other modules of system 1200. Permanent storage device 1202, on the other hand, is a read-and-write memory device. This device is a non-volatile memory unit that stores instructions and data even when system 1200 is off. Some implementations of the subject disclosure use a mass-storage device (such as a magnetic or optical disk arid its corresponding disk drive) as permanent storage device 1202.

Other implementations use a removable storage device (such as a floppy disk, flash drive, and its corresponding disk drive) as permanent storage device 1202. Like permanent storage device 1202, system memory 1204 is a read-and-write memory device. However, unlike storage device 1202, system memory 1204 is a volatile read-and-write memory, such a random access memory. System memory 1204 stores some of the instructions and data that the processor needs at runtime. In some implementations, the processes of the subject disclosure are stored in system memory 1204, permanent storage device 1202, and/or ROM 1210. For example, the various memory units include instructions for performing functions or operations corresponding to the different blocks shown in FIGS. 10 and 11 for processes 1000 and 1100, respectively, as described above. From these various memory units, processing unit(s) 1212 retrieves instructions to execute and data to process in order to execute the processes of some implementations.

Bus 1208 also connects to input and output device interfaces 1214 and 1206. Input device interface 1214 enables the user to communicate information and select commands to the system 1200. Input devices used with input device interface 1214 include, for example, alphanumeric, QWERTY, or T9 keyboards, microphones, and pointing devices (also called "cursor control devices"). Output device interfaces 1206 enables, for example, the display of images generated by the system 1200. Output devices used with output device interface 1206 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 12, bus 1208 also couples system 1200 to a public or private network (not shown) or combination of networks through a network interface 1216. Such a network may include, for example, a local area network ("LAN"), such as an Intranet, or a wide area network ("WAN"), such as the Internet. Any or all components of system 1200 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry, General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD-RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 1000 and 1100 of FIGS. 10 and 11, respectively, as described above, may be implemented using system 1200 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for calibrating gamma ray tools using blanket field calibrator models. In one embodiment of the present disclosure, a method of calibrating gamma ray tools using blanket field calibrator models includes: simulating a counting rate of a first gamma ray tool based on a model of a first blanket calibrator; determining whether the simulated counting rate matches a measured counting rate associated with the first gamma ray tool; when the simulated counting rate is determined to match the measured counting rate, determining a tally multiplier and a corresponding material specification for the model of the first blanket calibrator; simulating a counting rate for a second gamma ray tool based on the tally multiplier and the material specification determined for the model of the first blanket calibrator; determining a sensitivity factor for the second gamma ray tool, based on the simulation; and calibrating the second gamma ray tool according to a nominal blanket activity calculated from the sensitivity factor of the second gamma ray tool. Also, a computer-readable storage medium having instructions stored therein is disclosed, where the instructions, when executed by a computer, cause the computer to perform a plurality of functions, including functions to: simulate a counting rate of a first gamma ray tool based on a model of a first blanket calibrator; determine whether the simulated counting rate matches a measured counting rate associated with the first gamma ray tool; when the simulated counting rate is determined to match the measured counting rate, determine a tally multiplier and a corresponding material specification for the model of the first blanket calibrator; simulate a counting rate for a second gamma ray tool based on the tally multiplier and the material specification determined for the model of the first blanket calibrator; determine a sensitivity factor for the second gamma ray tool, based on the simulation; and calibrate the second gamma ray tool according to a nominal blanket activity calculated from the sensitivity factor of the second gamma ray tool.

One or more embodiments of the foregoing method and/or computer-readable storage medium may further include any one or any combination of the following additional elements, functions or operations: the first gamma ray tool may be a previously calibrated gamma ray tool having a known design or configuration and the second gamma ray tool may be an uncalibrated gamma ray tool having a new design or configuration; the sensitivity factor may be an American Petroleum Institute (API) unit sensitivity factor for the second gamma ray tool; the first blanket calibrator may be a reference blanket calibrator; simulating the counting rate for the second gamma ray tool may include simulating a first counting rate response of the second gamma ray tool to a low activity zone of a subsurface formation and simulating a second counting rate response of the second gamma ray tool to a high activity zone of the formation, and determining the sensitivity factor for the second gamma ray tool may include calculating the sensitivity factor based on the simulated first and second counting rates; determining the sensitivity factor may include calculating a tally multiplier for a model of a second blanket calibrator, based on the tally multiplier of the first blanket calibrator, determining a thorium concentration corresponding to the tally multiplier of the model of the second blanket calibrator, determining a material specification for the model of the second blanket calibrator, based on the thorium concentration, simulating a counting rate for the second gamma ray tool, based on the tally multiplier and the material specification determined for the model of the second blanket calibrator, and calculating the sensitivity factor for the second gamma ray tool, based on the counting rates simulated for the respective first and second blankets; each of the first and second blanket calibrators may include sheets of radioactive material, where the radioactive material may be radioactive monazite sand including at least one of thorium or uranium; the models of the first and second blanket calibrators may be Monte Carlo models; the simulation of counting rates using the Monte Carlo models of the respective first and second blanket calibrators may be performed based on an extended version of a Monte Carlo code for simulating correlated particle transport arising from cascade decay transitions of isotopes in the radioactive material associated with each blanket calibrator.

Furthermore, a system is described, where the system includes at least one processor and a memory coupled to the processor having instructions stored therein, which when executed by the processor, cause the processor to perform functions including functions to: simulate a counting rate of a first gamma ray tool based on a model of a first blanket calibrator; determine whether the simulated counting rate matches a measured counting rate associated with the first gamma ray tool; when the simulated counting rate is determined to match the measured counting rate, determine a tally multiplier and a corresponding material specification for the model of the first blanket calibrator; simulate a counting rate for a second gamma ray tool based on the tally multiplier and the material specification determined for the model of the first blanket calibrator; determine a sensitivity factor for the second gamma ray tool, based on the simulation; and calibrate the second gamma ray tool according to a nominal blanket activity calculated from the sensitivity factor of the second gamma ray tool.

One or more embodiments of the foregoing system may further include any one or any combination of the following additional elements, functions or operations: the first gamma ray tool may be a previously calibrated gamma ray tool having a known design or configuration and the second gamma ray tool may be an uncalibrated gamma ray tool having a new design or configuration; the sensitivity factor may be an American Petroleum Institute (API) unit sensitivity factor for the second gamma ray tool; the first blanket calibrator may be a reference blanket calibrator; simulating the counting rate for the second gamma ray tool may include simulating a first counting rate response of the second gamma ray tool to a low activity zone of a subsurface formation and simulating a second counting rate response of the second gamma ray tool to a high activity zone of the formation, and determining the sensitivity factor for the second gamma ray tool may include calculating the sensitivity factor based on the simulated first and second counting rates; determining the sensitivity factor may include calculating a tally multiplier for a model of a second blanket calibrator, based on the tally multiplier of the first blanket calibrator, determining a thorium concentration corresponding to the tally multiplier of the model of the second blanket calibrator, determining a material specification for the model of the second blanket calibrator, based on the thorium concentration, simulating a counting rate for the second gammy ray tool, based on the tally multiplier and the material specification determined for the model of the second blanket calibrator, and calculating the sensitivity factor for the second gamma ray tool, based on the counting rates simulated for the respective first and second blankets; each of the first and second blanket calibrators may include sheets of radioactive material, where the radioactive material may be radioactive monazite sand including at least one of thorium or uranium; the models of the first and second blanket calibrators may be Monte Carlo models; the simulation of counting rates using the Monte Carlo models of the respective first and second blanket calibrators may be performed based on an extended version of a Monte Carlo code for simulating correlated particle transport arising from cascade decay transitions of isotopes in the radioactive material associated with each blanket calibrator.

While specific details about the above embodiments have been described, the above hardware and software descriptions are intended merely as example embodiments and are not intended to limit the structure or implementation of the disclosed embodiments. For instance, although many other internal components of the system 1200 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the to plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of calibrating gamma ray tools using blanket field calibrator models, the method comprising:
   simulating a counting rate of a first gamma ray tool based on a model of a first blanket calibrator;
   determining whether the simulated counting rate matches a measured counting rate associated with the first gamma ray tool;
   when the simulated counting rate is determined to match the measured counting rate, determining a tally multiplier and a corresponding material specification for the model of the first blanket calibrator;
   simulating a counting rate for a second gamma ray tool based on the tally multiplier and the material specification determined for the model of the first blanket calibrator;
   determining a sensitivity factor for the second gamma ray tool, based on the simulation; and
   calibrating the second gamma ray tool according to a nominal blanket activity calculated from the sensitivity factor of the second gamma ray tool.

2. The method of claim 1, wherein the first gamma ray tool is a previously calibrated gamma ray tool having a known design or configuration and the second gamma ray tool is an uncalibrated gamma ray tool having a new design or configuration.

3. The method of claim 1, wherein the sensitivity factor is an American Petroleum Institute (API) unit sensitivity factor for the second gamma ray tool.

4. The method of claim 1, wherein the first blanket calibrator is a reference blanket calibrator.

5. The method of claim 1,
   wherein simulating the counting rate for the second gamma ray tool further comprises:
      simulating a first counting rate response of the second gamma ray tool to a low activity zone of a subsurface formation; and
      simulating a second counting rate response of the second gamma ray tool to a high activity zone of the formation, and
   wherein determining the sensitivity factor for the second gamma ray tool comprises:
      calculating the sensitivity factor based on the simulated first and second counting rates.

6. The method of claim 1, wherein determining the sensitivity factor comprises:
   calculating a tally multiplier for a model of a second blanket calibrator, based on the tally multiplier of the first blanket calibrator;
   determining a thorium concentration corresponding to the tally multiplier of the model of the second blanket calibrator;
   determining a material specification for the model of the second blanket calibrator, based on the thorium concentration;
   simulating a counting rate for the second gamma ray tool, based on the tally multiplier and the material specification determined for the model of the second blanket calibrator; and
   calculating the sensitivity factor for the second gamma ray tool, based on the counting rates simulated for the respective first and second blankets.

7. The method of claim 6, wherein each of the first and second blanket calibrators include sheets of radioactive material.

8. The method of claim 7, wherein the radioactive material is radioactive monazite sand including at least one of thorium or uranium.

9. The method of claim 6, wherein the models of the first and second blanket calibrators are Monte Carlo models.

10. The method of claim 9, wherein the simulation of counting rates using the Monte Carlo models of the respective first and second blanket calibrators is performed based on an extended version of a Monte Carlo code for simulating correlated particle transport arising from cascade decay transitions of isotopes in radioactive material associated with each blanket calibrator.

11. A system for calibrating gamma ray tools using blanket field calibrator models, the system comprising:
   at least one processor; and
   a memory coupled to the processor having instructions stored therein, which when executed by the processor, cause the processor to perform functions including functions to:
   simulate a counting rate of a first gamma ray tool based on a model of a first blanket calibrator;
   determine whether the simulated counting rate matches a measured counting rate associated with the first gamma ray tool;
   when the simulated counting rate is determined to match the measured counting rate, determine a tally multiplier and a corresponding material specification for the model of the first blanket calibrator;
   simulate a counting rate for a second gamma ray tool based on the tally multiplier and the material specification determined for the model of the first blanket calibrator;
   determine a sensitivity factor for the second gamma ray tool, based on the simulation; and
   calibrate the second gamma ray tool according to a nominal blanket activity calculated from the sensitivity factor of the second gamma ray tool.

12. The system of claim 11, wherein the first blanket calibrator is a reference blanket calibrator, the first gamma ray tool is a previously calibrated gamma ray tool having a known design or configuration, and the second gamma ray tool is an uncalibrated gamma ray tool having a new design or configuration.

13. The system of claim 11, wherein the sensitivity factor is an American Petroleum Institute (API) unit sensitivity factor for the second gamma ray tool.

14. The system of claim 11, wherein the functions performed by the processor further include functions to:
   simulate a first counting rate response of the second gamma ray tool to a low activity zone of a subsurface formation;
   simulate a second counting rate response of the second gamma ray tool to a high activity zone of the formation; and calculate the sensitivity factor based on the simulated first and second counting rates.

15. The system of claim 11, wherein the functions performed by the processor further include functions to:
- calculate a tally multiplier for a model of a second blanket calibrator, based on the tally multiplier of the first blanket calibrator;
- determine a thorium concentration corresponding to the tally multiplier of the model of the second blanket calibrator;
- determine a material specification for the model of the second blanket calibrator, based on the thorium concentration;
- simulate a counting rate for the second gamma ray tool, based on the tally multiplier and the material specification determined for the model of the second blanket calibrator; and
- calculate the sensitivity factor for the second gamma ray tool, based on the counting rates simulated for the respective first and second blankets.

16. The system of claim 15, wherein each of the first and second blanket calibrators include sheets of radioactive material.

17. The system of claim 16, wherein the radioactive material is radioactive monazite sand including at least one of thorium or uranium.

18. The system of claim 15, wherein the models of the first and second blanket calibrators are Monte Carlo models.

19. The system of claim 18, wherein the simulation of counting rates using the Monte Carlo models of the respective first and second blanket calibrators is performed based on an extended version of a Monte Carlo code for simulating correlated particle transport arising from cascade decay transitions of isotopes in radioactive material associated with each blanket calibrator.

20. A computer-readable storage medium having instructions stored therein, which when executed by a computer cause the computer to perform a plurality of functions, including functions to:
- simulate a counting rate of a first gamma ray tool based on a model of a first blanket calibrator;
- determine whether the simulated counting rate matches a measured counting rate associated with the first gamma ray tool;
- when the simulated counting rate is determined to match the measured counting rate, determine a tally multiplier and a corresponding material specification for the model of the first blanket calibrator;
- simulate a counting rate for a second gamma ray tool based on the tally multiplier and the material specification determined for the model of the first blanket calibrator;
- determine a sensitivity factor for the second gamma ray tool, based on the simulation; and
- calibrate the second gamma ray tool according to a nominal blanket activity calculated from the sensitivity factor of the second gamma ray tool.

* * * * *

UNITED STATES PATENT AND TRADEMARK OFFICE
CERTIFICATE OF CORRECTION

Page 1 of 1

PATENT NO. : 11,175,432 B2
APPLICATION NO. : 15/774989
DATED : November 16, 2021
INVENTOR(S) : James E. Galford It is certified that error appears in the above-identified patent and that said Letters Patent is hereby corrected as shown below:

In the Specification

Column 2, Line 44, change "EMBODMENTS" to -- EMBODIMENTS --

Column 6, Line 51, change "sting" to -- string --

Column 14, Line 32, change "ha.nd" to -- hand --

Column 21, Line 48, change "arid" to -- and --

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*